United States Patent
Scholl et al.

(10) Patent No.: US 10,442,355 B2
(45) Date of Patent: Oct. 15, 2019

(54) OBJECT VISUALIZATION IN BOWL-SHAPED IMAGING SYSTEMS

(71) Applicant: Intel Corporation, Santa Clara, CA (US)

(72) Inventors: Kay-Ulrich Scholl, Karlsbad (DE); Cornelius Buerkle, Karlsruhe (DE); Koba Natroshvili, Waldbronn (DE)

(73) Assignee: Intel Corporation, Santa Clara, CA (US)

( * ) Notice: Subject to any disclaimer, the term of this patent is extended or adjusted under 35 U.S.C. 154(b) by 1129 days.

(21) Appl. No.: 14/488,793

(22) Filed: Sep. 17, 2014

(65) Prior Publication Data

US 2016/0080699 A1 Mar. 17, 2016

(51) Int. Cl.
*H04N 7/18* (2006.01)
*B60R 1/10* (2006.01)
(Continued)

(52) U.S. Cl.
CPC .............. *B60R 1/00* (2013.01); *G06T 3/005* (2013.01); *G06T 15/04* (2013.01); *G06T 15/10* (2013.01);
(Continued)

(58) Field of Classification Search
CPC .. H04N 5/23238; H04N 5/265; H04N 5/2252; H04N 5/2259; H04N 7/181;
(Continued)

(56) References Cited

U.S. PATENT DOCUMENTS 6,577,335 B2 * 6/2003 Kobayashi ......... H04N 5/23238
348/152
7,038,577 B2 5/2006 Pawlicki
(Continued)

FOREIGN PATENT DOCUMENTS

CN 202038230 11/2011
CN 102729911 10/2012
(Continued)

OTHER PUBLICATIONS

Bay, Herbert, et al., "Speeded-Up Robust Features (SURF)" Sep. 10, 2008, 14 pages.
(Continued)

*Primary Examiner* — Dave Czekaj
*Assistant Examiner* — Kehinde Abimbola
(74) *Attorney, Agent, or Firm* — Barnes & Thornburg LLP

(57) ABSTRACT

Technologies for visualizing moving objects on a bowl-shaped image include a computing device to receive a first fisheye image generated by a first fisheye camera and capturing a first scene and a second fisheye image generated by a second fisheye camera and capturing a second scene overlapping with the first scene at an overlapping region. The computing device identifies a moving object in the overlapping region and modifies a projected overlapping image region to visualize the identified moving object on a virtual bowl-shaped projection surface. The projected overlapping image region is projected on the virtual bowl-shaped projection surface and corresponds with the overlapping region captured in the first and second fisheye images.

25 Claims, 12 Drawing Sheets

(51) Int. Cl.
*G06T 15/20* (2011.01)
*G06T 5/00* (2006.01)
*G06T 7/00* (2017.01)
*B60R 1/00* (2006.01)
*G06T 15/04* (2011.01)
*G06T 15/10* (2011.01)
*G06T 3/00* (2006.01)

(52) U.S. Cl.
CPC ........ *G06T 15/20* (2013.01); *B60R 2300/105* (2013.01); *B60R 2300/303* (2013.01); *G06T 2215/12* (2013.01)

(58) Field of Classification Search
CPC ............... H04N 7/188; H04N 13/0217; H04N 13/0239; H04N 13/0282; H04N 5/23212; H04N 5/2253; H04N 5/2254; H04N 5/247; H04N 13/0207; H04N 13/0285; H04N 13/0289; H04N 5/225; H04N 5/2257; H04N 5/23206; H04N 5/23229; H04N 5/23235; H04N 13/305; H04N 13/31; H04N 13/398; H04N 13/351; H04N 13/359; H04N 13/366; H04N 13/161; H04N 13/383; H04N 2013/405; H04N 21/235; H04N 21/4122; H04N 21/435; H04N 13/139; B60R 1/00; B60R 2300/105; B60R 2300/303; B60R 2300/802; B60R 2300/20; G06T 15/04; G06T 15/10; G06T 15/20
See application file for complete search history.

(56) References Cited

U.S. PATENT DOCUMENTS

| | | | | |
|---|---|---|---|---|
| 7,068,444 | B2* | 6/2006 | Nishi | G02B 13/06 345/7 |
| 7,139,432 | B2 | 11/2006 | Wenzel | |
| 7,161,616 | B1 | 1/2007 | Okamoto | |
| 7,164,421 | B2* | 1/2007 | Miura | G06T 15/506 345/426 |
| 7,229,176 | B2* | 6/2007 | Onaga | G03B 21/26 353/10 |
| 7,251,356 | B2 | 7/2007 | Seo | |
| 7,307,655 | B1 | 12/2007 | Okamoto | |
| 7,336,299 | B2 | 2/2008 | Kostrzewski | |
| 7,388,982 | B2 | 6/2008 | Endo | |
| 7,576,639 | B2* | 8/2009 | Boyles | G06K 9/00369 340/425.5 |
| 7,796,154 | B2* | 9/2010 | Senior | H04N 5/232 348/154 |
| 7,825,953 | B2* | 11/2010 | Kato | B60R 1/00 340/461 |
| 8,319,618 | B2 | 11/2012 | Gomil | |
| 8,447,116 | B2 | 5/2013 | Ma | |
| 9,311,706 | B2* | 4/2016 | Natroshvili | G06T 5/006 |
| 9,436,987 | B2* | 9/2016 | Ding | G06T 7/00 |
| 2001/0040624 | A1* | 11/2001 | Kobayashi | H04N 5/23238 348/152 |
| 2003/0085999 | A1 | 5/2003 | Okamoto | |
| 2004/0228544 | A1 | 11/2004 | Endo | |
| 2005/0001835 | A1* | 1/2005 | Miura | G06T 15/506 345/426 |
| 2005/0151938 | A1* | 7/2005 | Onaga | G03B 21/26 353/94 |
| 2006/0072215 | A1* | 4/2006 | Nishi | G02B 13/06 359/708 |
| 2006/0244829 | A1* | 11/2006 | Kato | B60R 1/00 348/148 |
| 2007/0085901 | A1 | 4/2007 | Yang | |
| 2007/0229238 | A1* | 10/2007 | Boyles | G06K 9/00369 340/435 |
| 2008/0317370 | A1 | 12/2008 | Florent | |
| 2009/0263045 | A1 | 10/2009 | Szeliski | |
| 2010/0134325 | A1 | 6/2010 | Gomi | |
| 2011/0032357 | A1 | 2/2011 | Kitaura | |
| 2012/0069153 | A1* | 3/2012 | Mochizuki | B60R 1/00 348/47 |
| 2012/0140988 | A1 | 6/2012 | Takahashi | |
| 2012/0262580 | A1 | 10/2012 | Huebner | |
| 2012/0293659 | A1* | 11/2012 | Bandou | G06K 9/00791 348/148 |
| 2012/0320190 | A1* | 12/2012 | Natroshvili | G06T 5/006 348/135 |
| 2013/0033602 | A1 | 2/2013 | Quast | |
| 2013/0286193 | A1 | 10/2013 | Pflug | |
| 2014/0002488 | A1 | 1/2014 | Summa | |
| 2014/0125774 | A1 | 5/2014 | Lee | |
| 2014/0168475 | A1* | 6/2014 | Corkery | G03B 37/04 348/239 |
| 2014/0169627 | A1 | 6/2014 | Gupta | |
| 2014/0314336 | A1 | 10/2014 | Takuya Yahi et al. | |
| 2014/0333720 | A1 | 11/2014 | Huang | |
| 2015/0178884 | A1 | 6/2015 | Scholl et al. | |
| 2015/0317821 | A1* | 11/2015 | Ding | G06T 7/00 345/420 |
| 2015/0334301 | A1 | 11/2015 | He | |
| 2016/0371843 | A1 | 12/2016 | Scholl et al. | |

FOREIGN PATENT DOCUMENTS

| | | |
|---|---|---|
| CN | 102982526 | 3/2013 |
| CN | 103247168 | 8/2013 |
| DE | 102012018326 A1 | 3/2014 |
| EP | 2629237 | 8/2013 |
| JP | 2006-031313 | 2/2006 |
| JP | 2006059202 | 3/2006 |
| JP | 2007109166 A | 4/2007 |
| JP | 2007183877 | 7/2007 |
| JP | 2010128951 A | 6/2010 |
| JP | 2011086111 A | 4/2011 |
| JP | 2011-155651 A | 11/2011 |
| JP | 2011-254436 | 12/2011 |
| JP | 2013207637 | 10/2013 |
| KR | 2002-0033816 | 5/2002 |
| KR | 10-0966875 | 6/2010 |
| KR | 10-2010-0107378 | 10/2010 |
| KR | 20130059658 | 6/2013 |
| WO | 2015094298 A1 | 6/2015 |

OTHER PUBLICATIONS

Scaramuzza, Davide, et al., "A Flexible Technique for Accurate Omnidirectional Camera Calibration and Structure from Motion," ICVS 2006, 8 pages.

Shimizu, Seiya, et al., "Wraparound View System for Motor Vehicles," FUJITSU Sci. Tech. J., vol. 46, No. 1, pp. 95-102, Jan. 2010, 8 pages.

Fleet, David J., et al., "Optical Flow Estimation," Appears in "Mathematical Models in Computer Vision: The Handbook," N. Paragios, Y. Chen, and O. Faugeras (editors), Chapter 15, 2005, pp. 239-258, 24 pages.

"Extended Kalman filter," http://en.wikipedia.org/wiki/Extended_Kalman_filter, printed Oct. 31, 2014, 8 pages.

Patent Application No. PCT/US2013/76644, by Scholl, et al., filed Dec. 19, 2013, 79 pages.

International Search Report for PCT/US15/045649, dated Dec. 9, 2015 (3 pages).

Written Opinion for PCT/US15/045649, dated Dec. 9, 2015 (7 pages).

"Image alignment and stitching; a tutorial," by Richard Szeliski Technical Report MSR-TR-2004-92 dated Dec. 10, 2006.

Notice of Preliminary Rejection for KR 10-2016-7012786 dated Sep. 5, 2017, 11 pages.

Office Action for JP 2016-538099 dated May 11, 2017, 6 pages, with English language translation.

Extended European Search Report dated Apr. 20, 2018 for European patent Application No. 15843002.5-1208, 16 pages.

(56) References Cited

OTHER PUBLICATIONS

Translation of Office Action dated May 29, 2018 for Japanese Patent Application No. 2017-514834, 20 pages.
Extended European Search Report for European Patent Application No. 15842249.3, dated Jul. 19, 2018 (9 pages).
Bastian Leibe et al: "Coupled Detection and Trajectory Estimation for Multi-Object Tracking", !CCV 2007. IEEE IITH International Conference on Computer Vision, 2007, IEEE, Oct. 1, 2007 (Oct. 1, 2007), pp. 1-8, XP031194425, ISBN: 978-1-4244-1630-1.
Bastian Leibe et al: "Dynamic 3D Scene Analysis from a Moving Vehicle", 2007 IEEE Conference on Computer Vision and Pattern Recognition, Jun. 1, 2007 (Jun. 1, 2007), pp. 1-8, XP055170062, DOI: 10.1109/CVPR.2007.383146 ISBN: 978-1-42-441180-1.
Leibe Bet Al: "Pedestrian Detection in Crowded Scenes", Proceedings/ 2005 IEEE Computer Society Conference on Computer Vision and Pattern Recognition, CVPR 2005 . [Jun. 20-25, 2005, San Diego, CA], IEEE, Piscataway, NJ, USA, vol. I, Jun. 20, 2005 (Jun. 20, 2005), pp. 878-885, XP010817364, DOI: 10.1109/CVPR.2005.272 ISBN: 978-0-7695-2372-9.
Hughes C et al: "Wide-angle camera technology for automotive applications: a review", IET Intelligent Transport Sys,, vol. 3, No. I, Mar. 9, 2009 (Mar. 9, 2009), pp. 19-31, XP006032372, ISSN: 1751-9578, DOI: 10.1049/IET-ITS:2008001.
Notice of Reason(s) of Rejection in Japanese Patent Application No. 2017-515141, including English translation, dated Apr. 24, 2018 (19 pages).
Office action in European Patent Application No. 1583002.5, dated Mar. 26, 2019 (12 pages).
First Office action in Chinese patent application No. 2015800438470, dated Jan. 21, 2019, including machine translation (12 pages).
Brian Richards, "How to make an object stand out from the background in Photoshop," https://itstillworks.com/make-object-stand-out-background-photoshop-8054.html, retrieved Mar. 20, 2019.
Second Office action in Chinese patent application No. 2015800438470, dated Jul. 11, 2019, including machine translation (10 pages).

\* cited by examiner

OBJECT VISUALIZATION IN BOWL-SHAPED IMAGING SYSTEMS

BACKGROUND

Vehicle-mounted camera systems such as rearview cameras have become mainstays in luxury vehicles and even some lower-end vehicles. Depending on the particular implementation, a vehicle camera system may be used for improved vision, automated parallel parking, and/or other purposes. For example, images captured by vehicle-mounted cameras may be displayed on a navigation system display screen of the vehicle providing the driver with an unobstructed backward view (i.e., better than the rearview mirror) or overhead view of the vehicle (i.e. showing the vehicle's surroundings).

Several cameras may be mounted to a vehicle to capture all of the surroundings of the vehicle (i.e., the full 360 degrees). Such vehicle-mounted camera systems may utilize wide-angle cameras such as those having fisheye lenses (i.e., fisheye cameras) in order to minimize the number of cameras necessary to capture the vehicle surroundings. However, overlapping areas of neighboring cameras may result in different projections of a single real-world point, which may cause image ambiguity, duplicity, and/or invisible objects. For example, pedestrians walking in the overlapping area may be displayed twice or, worse, not at all. Because such vehicle-mounted camera systems provide the driver with a sense that she is able to see everything surrounding the vehicle, the danger associated with invisible objects (i.e., objects not being displayed) is amplified.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
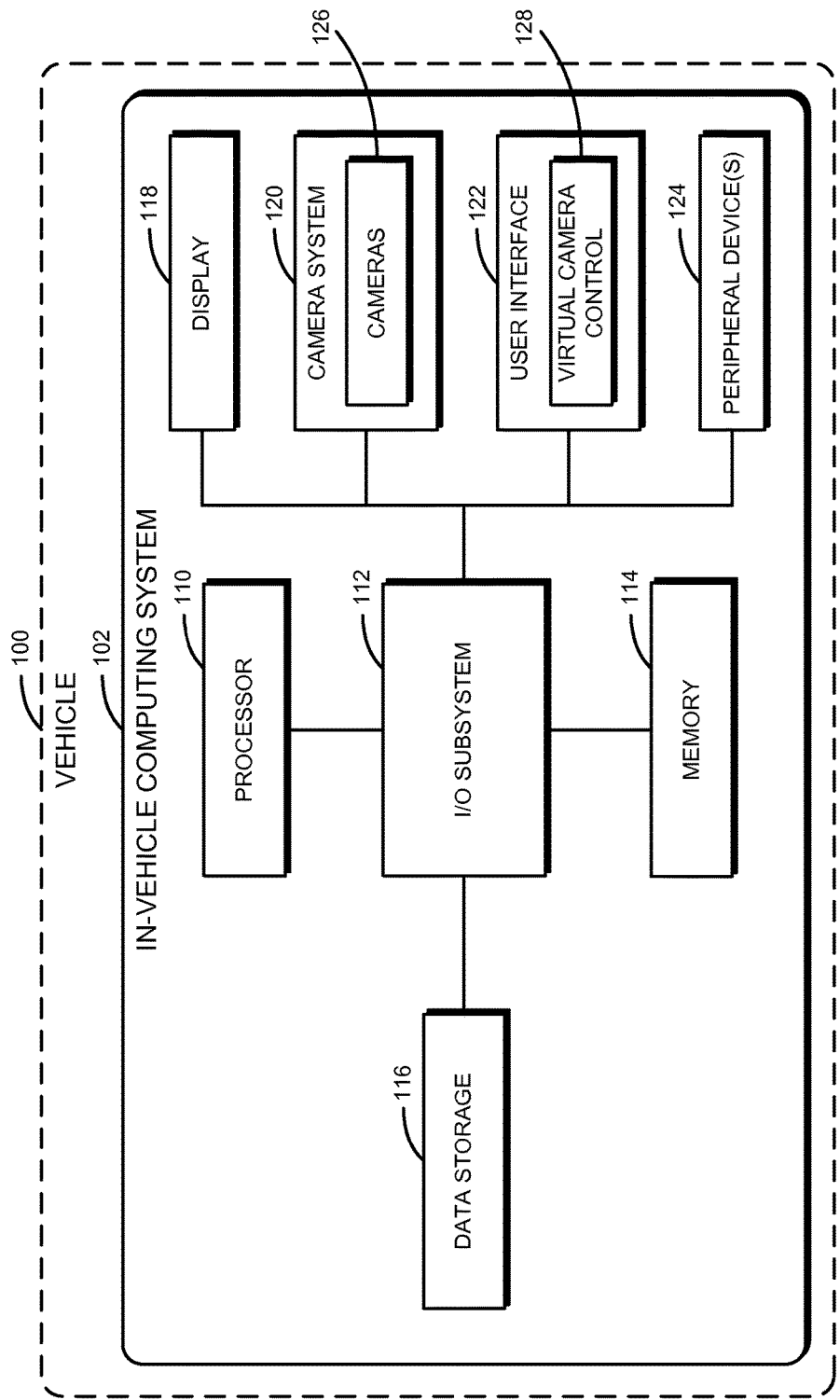
FIG. 1 is a simplified block diagram of at least one embodiment of an in-vehicle computing system of a vehicle for displaying a physical environment surrounding the vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 4:
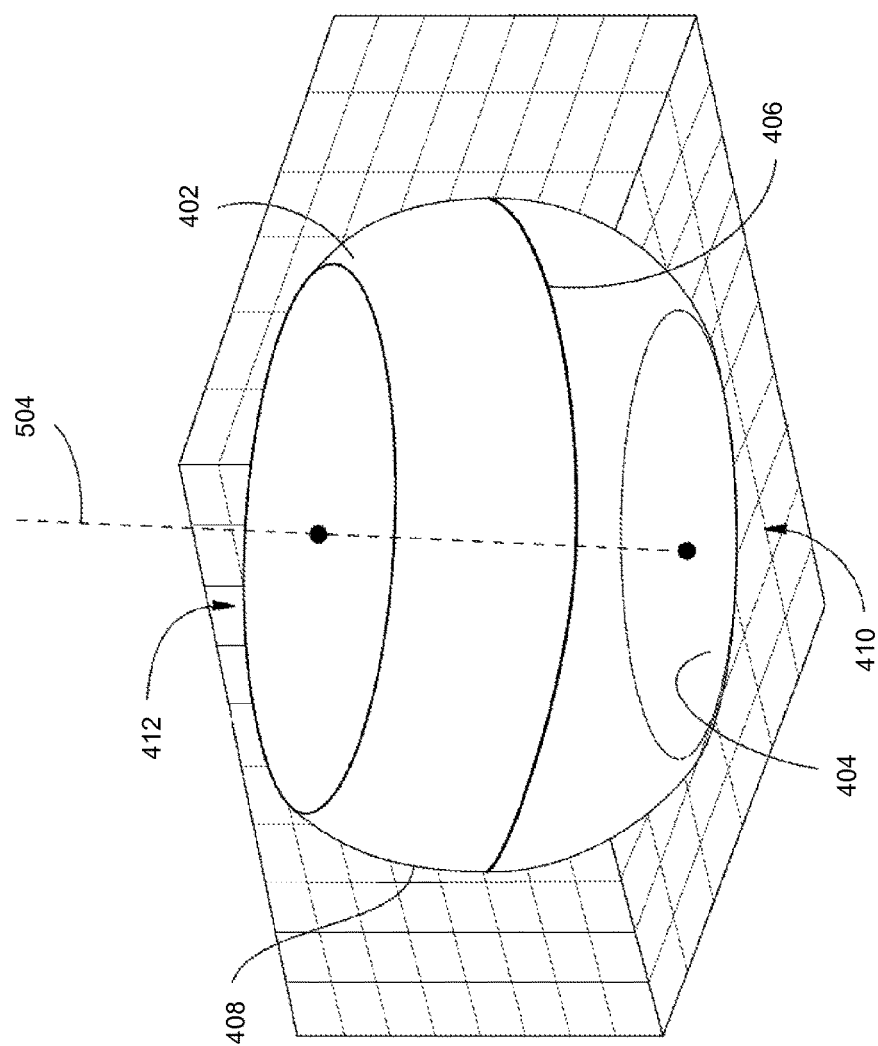
FIG. 4 is a simplified illustration of at least one embodiment of a virtual bowl-shaped projection surface.

Referring now to FIG. 1, in the illustrative embodiment, a vehicle 100 includes an in-vehicle computing system 102, which may be embodied as any type of computing system capable of performing the functions described herein. In the illustrative embodiment, the vehicle 100 is embodied as a wheeled passenger vehicle (e.g., a car, truck, truck-tractor, bus, etc.). However, it should be appreciated that, in other embodiments, the vehicle 100 may be embodied as another type of vehicle (e.g., as a rail-driven trolley, an unmanned vehicle, or another vehicle suited for application of the described techniques and mechanisms) or other moveable apparatus. As described herein, in the illustrative embodiment, the in-vehicle computing system 102 is configured to capture fisheye images with adjacent fisheye cameras having overlapping fields of view (i.e., scenes). The in-vehicle computing system 102 identifies an object moving in the overlapping region and modifies a projected overlapping image region (i.e., corresponding with the overlapping region associated with the overlapping fields of view) to visualize the identified moving object on a virtual bowl-shaped projection surface (see, e.g., FIG. 4). In some embodiments, the in-vehicle computing system 102 projects the identified moving object's contour onto the virtual bowl-shaped projection surface to visualize the moving object, whereas in other embodiments, the in-vehicle computing system 102 modifies a junction between adjacent fisheye images (e.g., images captured by adjacent fisheye cameras) within an overlapping region of the fisheye images to visualize the moving object. In some embodiments, the in-vehicle computing system 102 may be embodied as, or form a portion of, an in-vehicle infotainment system, a navigation system, and/or other vehicle-based computing system. In other embodiments, the in-vehicle computing system 102 may instead be embodied as a standalone computing device or computing system.

Further, in some embodiments, a remote computing device may be communicatively coupled with the in-vehicle computing system 102 and configured to perform one or more of the functions described herein (e.g., remotely) and communicate the results to the in-vehicle computing system 102 via a network (e.g., a wired or wireless communication network). In such embodiments, the remote computing device may be embodied as any type of computing device capable of communicating with the in-vehicle computing system 102 and performing the functions described herein (e.g., a server, desktop computer, laptop computer, tablet computer, notebook, netbook, Ultrabook™, cellular phone, smartphone, personal digital assistant, mobile Internet device, wearable computing device, Hybrid device, and/or any other computing/communication device).

As shown in FIG. 1, the illustrative in-vehicle computing system 102 includes a processor 110, an input/output ("I/O") subsystem 112, a memory 114, a data storage 116, a display 118, a camera system 120, a user interface 122, and, in some embodiments, one or more peripheral devices 124. Additionally, the camera system 120 includes one or more cameras 126 and the user interface 122 includes a virtual camera control 128. Of course, the in-vehicle computing system 102 may include other or additional components, such as those commonly found in a typical computing device (e.g., communication circuitry, various input/output devices, and/or other components), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the in-vehicle computing system 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the in-vehicle computing system 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the in-vehicle computing system 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the in-vehicle computing system 102 such as, for example, captured and processed images, image filters, component parameters (e.g., intrinsic parameters of the cameras 126), and/or other data useful in the operation of the in-vehicle computing system 102 as discussed below.

The display 118 of the in-vehicle computing system 102 may be embodied as any one or more display screens on which information may be displayed to a user of the in-vehicle computing system 102 (e.g., a driver or passenger of the vehicle 100). The display 118 may be embodied as, or otherwise use, any suitable display technology including, for example, a liquid crystal display (LCD), a light emitting diode (LED) display, a cathode ray tube (CRT) display, a plasma display, a holographic or other three-dimensional (3D) display, and/or other display technology. Although only a single display 118 is illustrated in FIG. 1, it should be appreciated that the in-vehicle computing system 102 may include multiple displays or display screens on which the same or different content may be displayed contemporaneously or sequentially with each other. The display 118 may be embodied as a general purpose display on which various vehicle operating parameters and/or vehicle infotainment information (e.g., radio station, temperature controls, etc.) are displayed. Alternatively, the display 118 may be embodied as a specific purpose display for displaying images generated by the camera system 120 as discussed below.

The camera system 120 includes one or more cameras 126, which may be used to capture images of a surrounding environment of the vehicle 100 or, more particularly, a surrounding environment of the in-vehicle computing system 102. It should be appreciated that, in the illustrative embodiment, the cameras 126 of the camera system 120 are suitably spaced to capture the full 360-degree surroundings of the vehicle 100 or a substantial portion thereof. In some embodiments, the field of view of each camera 126 overlaps with one or more other cameras 126. In particular, adjacent cameras 126 may be configured to capture corresponding scenes that overlap with one another at an overlapping region. Additionally, in some embodiments, the geometry associated with the positioning of the cameras 126 relative to one another and/or relative to the vehicle 100 is known or able to be determined.

Each of the cameras 126 may be embodied as any peripheral or integrated device suitable for capturing images, such as a still camera, a video camera, a webcam, or other device capable of capturing video and/or images. In the illustrative embodiment, each of the cameras 126 is embodied as a fisheye camera to facilitate capture of the complete, or near complete, surroundings of the vehicle 100. Of course, in other embodiments, other types of wide or narrow angled cameras may be used depending on, for example, the type of vehicle 100, the type of cameras 126 used, the number of cameras 126 used, and/or other criteria. Additionally, the camera system 120 may include two or more cameras 126 to capture the surroundings of the vehicle 100 depending on such various criteria. In the illustrative embodiment, the camera system 120 includes four fisheye cameras 126 (i.e., cameras 126 having fisheye lenses) mounted to, or integrated with, the vehicle 100 to capture the full surroundings of the vehicle 100 while minimizing the number of cameras 126 necessary to do so. For example, as shown in the illustrative embodiment of FIG. 2, a camera 126 may be mounted to each of the four sides of the vehicle 100 (i.e., the front, rear, driver's side, and passenger's side). Of course, in other embodiments, the in-vehicle computing system 102 may utilize a different number, type, and/or relative positioning of the cameras 126. For example, in another embodiment, the cameras 126 may be positioned in other locations about the vehicle 100 (e.g., at the corners of the vehicle 100). Depending on the particular embodiment, the cameras 126 of the camera system 120 may be of the same type or of different types. For example, in some embodiments, one or more of the cameras 126 of the camera system 120 may have fisheye lenses and one or more of the cameras 126 may have traditional lenses.

The user interface 122 permits a user of the in-vehicle computing system 102 to interact with the in-vehicle computing system 102. For example, as discussed below, the user may interact with the in-vehicle computing system 102 to display the surroundings of the vehicle 100 on the display 118. As such, in some embodiments, the user interface 122 includes one or more virtual and/or physical buttons, knobs, switches, keypads, touchscreens, and/or other mechanisms to permit I/O functionality. For example, in some embodiments, the user interface 122 may be integrated with a navigation or infotainment system of the vehicle 100. As discussed above, the user interface 122 includes a virtual camera control 128 in the illustrative embodiment. The virtual camera control 128 permits a user of the in-vehicle computing system 102 to modify the field of view of a virtual camera 202 (see FIG. 2) of the in-vehicle computing system 102 (e.g., by "moving" the virtual camera). As discussed in detail below, the virtual camera 202 "captures" the image to be rendered on the display 118, which may correspond with a single image captured by one of the cameras 126 or a combination of images captured by multiple cameras 126 (e.g., adjacent cameras 126). Accordingly, by rotating or otherwise moving the virtual camera 202 and thereby changing the field of view of the virtual camera 202, the displayed image may be adjusted by the user of the in-vehicle computing system 102. As discussed in further detail below, a bowl-shaped image is generated based on images of the surroundings of the vehicle 100 captured by the cameras 126 and processed by the in-vehicle computing system 102. As such, in some embodiments, the bowl-shaped image may be rendered on the display 118 based on the field of view of the virtual camera 202, which may include a combination of field of views from multiple cameras 126. For example, the bowl-shaped image may be displayed based on a perspective from which the bowl-shaped image is "captured" by the virtual camera 202 (e.g., from the top/bottom, from far/near, from inside/outside the bowl-shaped image, etc.).

In some embodiments, the in-vehicle computing system 102 may also include one or more peripheral devices 124. The peripheral devices 124 may include any number of additional peripheral or interface devices, such as speakers, microphones, additional storage devices, and so forth. The particular devices included in the peripheral devices 124 may depend on, for example, the type and/or intended use of the in-vehicle computing system 102 (e.g., whether the in-vehicle computing system 102 is a stand-alone system or incorporated into a larger in-vehicle infotainment system). It should be appreciated that, depending on the particular embodiment, one or more components of the in-vehicle computing system 102 may be omitted (e.g., the virtual camera control 128 and/or the peripheral devices 124).

Figure 3:
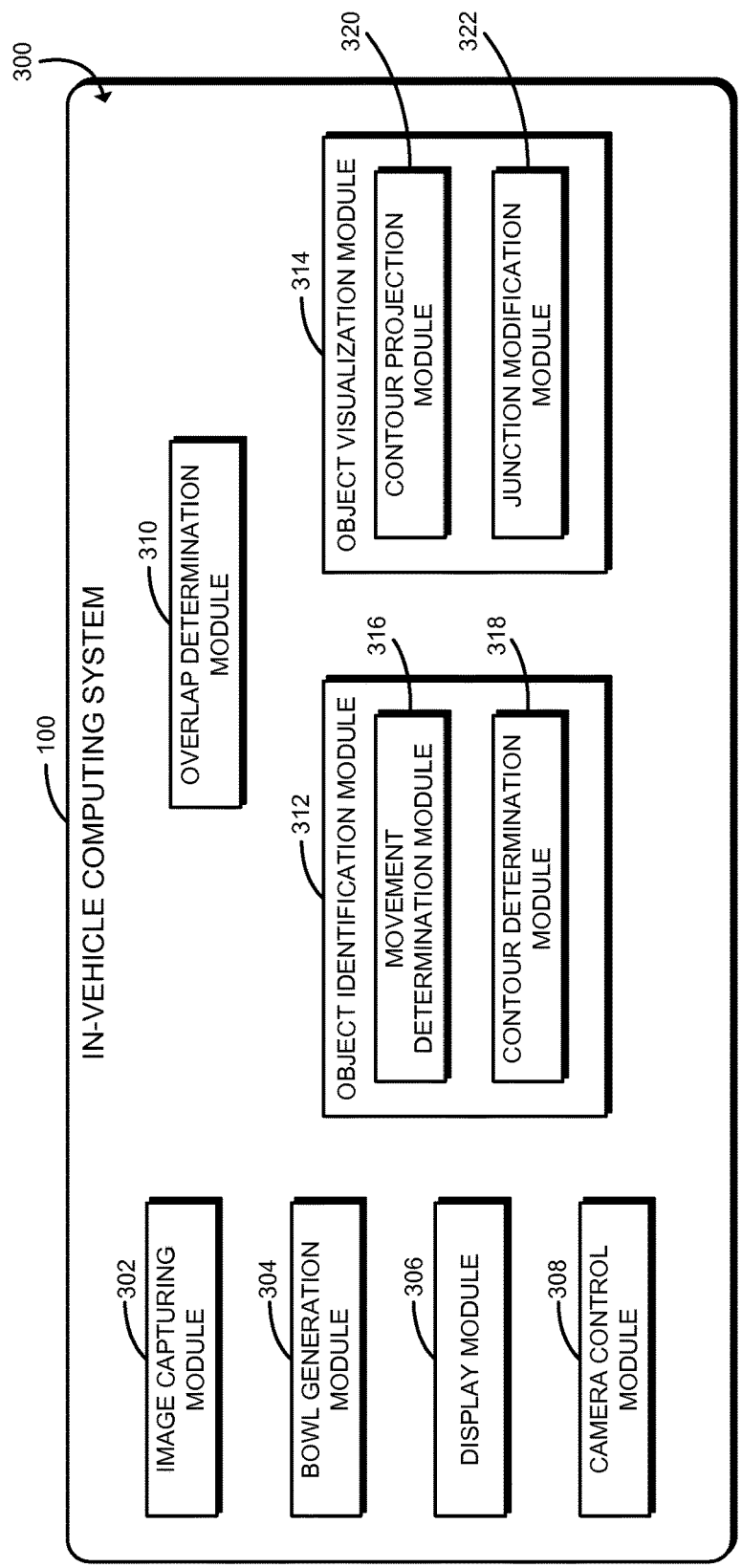
FIG. 3 is a simplified block diagram of at least one embodiment of an environment established by the in-vehicle computing system of FIG. 1.

Referring now to FIG. 3, in use, the in-vehicle computing system 102 establishes an environment 300 for visualizing moving objects on a bowl-shaped image of the surroundings of the vehicle 100. As discussed below, in the illustrative embodiment, the in-vehicle computing system 102 receives fisheye images from adjacent fisheye cameras 126, which capture scenes (i.e., fields of view) that overlap with one another at an overlapping region. It should be appreciated that the size and/or shape of the overlapping region depends on, for example, the geometry of the camera system 120. Additionally, in the overlapping region, the captured images include depictions of the same real-world points of the environment surrounding the vehicle 100 and therefore include the same image features. The illustrative in-vehicle computing system 102 further identifies a moving object in the overlapping region and modifies a projected version of the overlapping image region (e.g., a projection to the virtual bowl-shaped projection surface of FIG. 4) to visualize the identified moving object. Of course, in some embodiments, the in-vehicle computing system 102 may modify the fisheye images or a combined/processed version of the fisheye images prior to projection to the virtual bowl-shaped projection surface. As described below, the in-vehicle computing system 102 may project the identified moving object's contour onto the virtual bowl-shaped projection surface or modifying a junction between adjacent fisheye images (i.e., within the overlapping image region) to visualize the moving object.

The illustrative environment 300 of the in-vehicle computing system 102 includes an image capturing module 302, a bowl generation module 304, a display module 306, a camera control module 308, an overlap determination module 310, an object identification module 312, and an object visualization module 314. Additionally, the object identification module 312 includes a movement determination module 316 and a contour determination module 318, and the object visualization module 314 includes a contour projection module 320 and a junction modification module 322. Each of the modules of the environment 300 may be embodied as hardware, software, firmware, or a combination thereof. For example, each of the modules, logic, and other components of the environment 300 may form a portion of, or otherwise be established or executed by, the processor 110 or other hardware component(s) of the in-vehicle computing system 102. Additionally, in some embodiments, one or more of the illustrative modules may form a portion of another module and/or one or more of the illustrative modules may be embodied as a standalone or independent module (e.g., the movement determination module 316 may be separate from the object identification module 312). It should be appreciated that, in some embodiments, one or more of the techniques and/or modules described in International Patent Application Serial No. PCT/US2013/076644, filed Dec. 19, 2013, may be utilized by the in-vehicle computing system 102 and/or included in the environment 300 described herein. Similarly, the techniques and/or modules described herein may be utilized in in some embodiments of the in-vehicle computing system described in International Patent Application Serial No. PCT/US2013/076644.

The image capturing module 302 controls the cameras 126 of the camera system 120 to capture images/video of scenes within the field of view of each of the cameras 126. Depending on the particular embodiment, the image capturing module 302 may instruct each camera 126 to capture images continuously (e.g., as a video stream), periodically, in response to temporal or conditional inputs, as a combination thereof, or based on another scheme. For example, the cameras 126 may capture images when the transmission of the vehicle 100 is in reverse mode and/or when the vehicle 100 is moving below a certain threshold speed.

The bowl generation module 304 generates a virtual bowl-shaped projection surface 402 (see FIG. 4) on which images captured by the cameras 126 of the camera system 120, or processed versions thereof (e.g., combined images), may be projected for viewing by the user of the in-vehicle computing system 102 (e.g., the driver of the vehicle 100). In most in-vehicle imaging systems, visualizations of images captured by vehicle-mounted cameras result in significant distortion of objects that are not located on a ground plane 404 (see FIG. 4) upon which the vehicle rests. In the illustrative embodiment, the virtual bowl-shaped projection surface 402 has specifically defined geometric characteristics such as, for example, a smoothness of the virtual bowl-shaped projection surface 402, a smooth transition between the virtual bowl-shaped projection surface 402 and the ground plane 404, and flatness of the bowl-shaped projection surface 402 at the ground plane 404. In the illustrative embodiment, the bowl generation module 304 determines the desired geometry of the virtual bowl-shaped projection surface 402 based on various parameters related to the size of the vehicle 100 (e.g., length, width, height, etc.) and/or other features (e.g., bowl height, horizontal offset, adaptive ratios, etc.) and constructs the virtual bowl-shaped projection surface 402 (e.g., by constructing each horizontal slice 406 of the virtual bowl-shaped projection surface 402). Each horizontal slice may have a width dependent on the particular embodiment (e.g., non-uniform widths) in some embodiments.

Figure 5A:
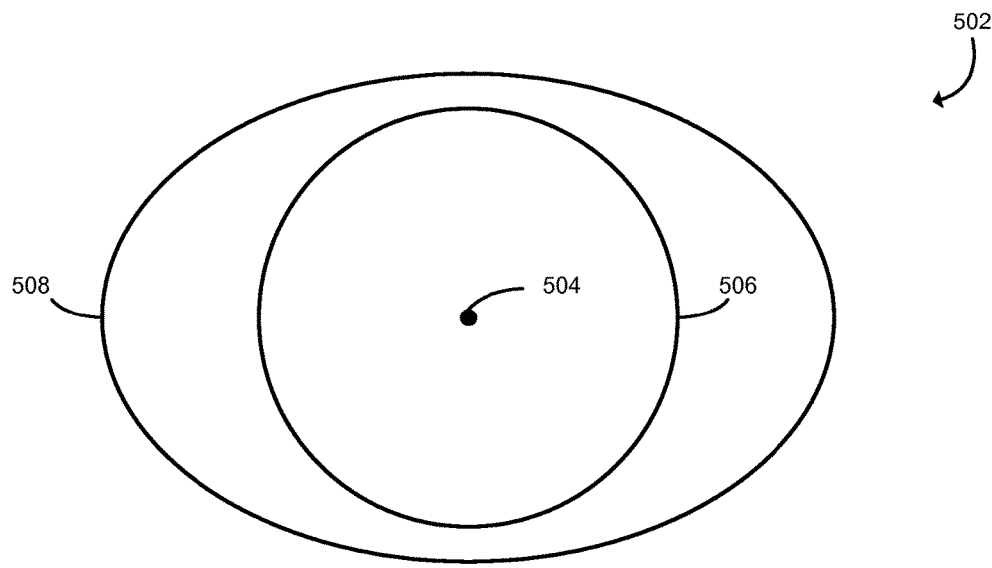
FIGS. 5A and 5B are simplified illustrations of a top view and a bottom view, respectively, of the virtual bowl-shaped projection surface of FIG. 4.
Figure 5B:
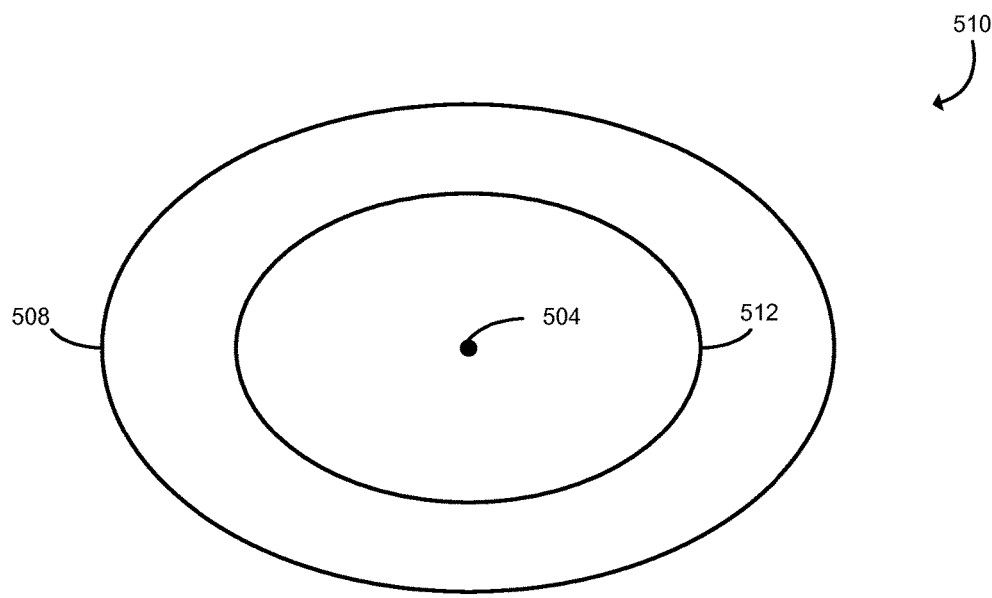

It should be appreciated that, in the illustrative embodiment, the virtual bowl-shaped projection surface 402 is shaped such that the vehicle 100, or a virtual representation thereof, is positioned inside the bowl-shaped projection surface 402 on the ground plane 404. As described in detail below, based on that information, the bowl generation module 304 determines the major and minor semi-axes of a vertical slice 408 (see FIG. 4) of the bowl-shaped projection surface 402 along the length of the vehicle 100. Additionally, the bowl generation module 304 determines, for each horizontal slice of the virtual bowl-shaped projection surface 402 (e.g., from bottom 410 to top 412), the major semi-axis of the corresponding horizontal slice based on the major and minor semi-axes of the vertical slice 408 and the minor semi-axis of the corresponding horizontal slice based on an adaptive ratio between the major and minor semi-axes of the corresponding horizontal slice. As described below, in the illustrative embodiment, the adaptive ratio changes linearly and is approximately unity (i.e., 1.0) at the top 412 of the bowl-shaped projection surface 402 and equal to the length of the vehicle 100 divided by the width of the vehicle 100 (i.e., carLength/carWidth) at the bottom 410 of the bowl-shaped projection surface 402. As shown in FIG. 5A, from a top view 502 of the bowl-shaped projection surface 402 looking along an axis 504 of the bowl-shaped projection surface 402, the top-most horizontal slice 506 of the bowl-shaped projection surface 402 has a circular geometric shape and a largest slice 508 of the bowl-shaped projection surface 402 is toward the vertical middle of the bowl-shaped projection surface 402. Further, as shown in FIG. 5B, from a bottom view 510 of the bowl-shaped projection surface 402 looking along the axis 504, the bottom-most horizontal slice 512 of the bowl-shaped projection surface 402 has a non-circular elliptical geometric shape (i.e., the bottom-most horizontal slice 512 defines an ellipse for which its major axis does not equal its minor axis).

Figure 6:
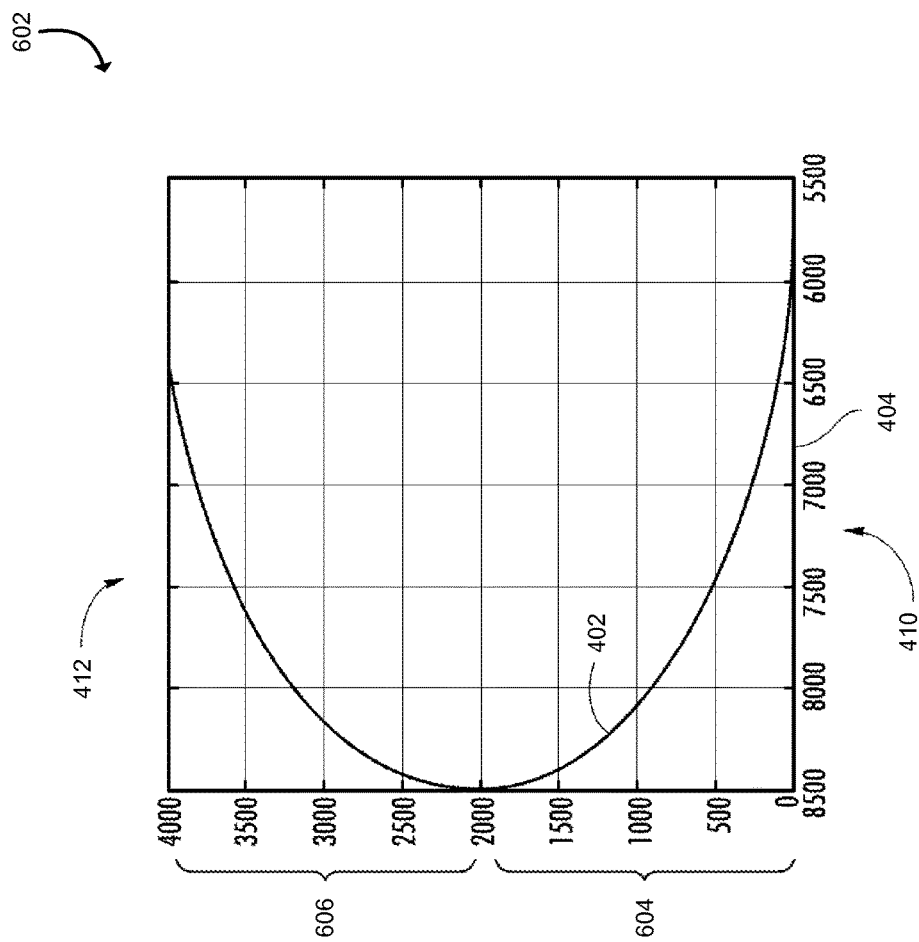
FIG. 6 is a simplified illustration of a vertical cross-section of the virtual bowl-shaped projection surface of FIG. 4.

The bowl generation module 304 further combines horizontal slices to generate the virtual bowl-shaped projection surface 402. For example, the bowl generation module 304 may stack the horizontal slices of the bowl-shaped projection surface 402 and merge those slices together to form the resultant bowl-shaped projection surface 402. Additionally, the bowl generation module 304 may generate and merge a bottom 410 of the bowl, which is a flat ground plane 404 (or partial-plane, more specifically). It should be appreciated that the top 412 of the bowl-shaped projection surface 402 is partially open and portions of the environment above the vehicle 100 may be projected on a top portion of the bowl-shaped projection surface 402. In the illustrative embodiment, a section of the generated virtual bowl-shaped projection surface 402 adjacent the ground plane 404 is filtered or otherwise smoothed. As shown in FIG. 6 by a portion of a vertical cross section 602 of the bowl-shaped projection surface 402 (e.g., taken perpendicular to the vertical slice 408), a bottom portion 604 of the bowl-shaped projection surface 402 approaches the bottom 410 of the bowl-shaped projection surface 402 (i.e., the ground plane 404) at a slower rate than a top portion 606 of the bowl-shaped projection surface 402 approaches the top 412 of the bowl-shaped projection surface 402.

It should be appreciated that, in the illustrative embodiment, an image projected onto the bowl-shaped projection surface 402 (referred to herein as "a bowl-shaped image") will include those features described above with regard to the bowl-shaped projection surface 402 (i.e., the bowl-shaped image will include a bottom portion having a derivative with an absolute value that is less than the absolute value of the derivative of the top portion. Further, the bottom portion of the bowl-shaped projection surface 402 merges with the ground plane 404 of the bowl-shaped projection surface 402 such that the derivative of the surface at any place is definite (i.e., there exist no singularities). It should be appreciated that the bowl generation module 304 may use any suitable image filters, algorithms, techniques, and/or mechanisms to generate the virtual bowl-shaped projection surface and bowl-shaped images. Of course, in some embodiments, the bowl generation module 304 may generate a virtual bowl-shaped projection surface having features different from the virtual bowl-shaped projection surface 402 of FIG. 4 described herein.

Referring back to FIG. 3, the display module 306 renders images on the display 118 for a user of the in-vehicle computing system 102 to view. For example, the display module 306 may "project" one or more fisheye images, processed images, and/or other types of images onto the virtual bowl-shaped projection surface 402 generated by the bowl generation module 304 to create a bowl-shaped image and display the bowl-shaped image, or a portion thereof, on the display 118. Of course, it should be appreciated that, in some embodiments, the generated images or combined images are not "projected" onto the bowl-shaped projection surface 402 in the traditional sense; rather, the generated images may be modified to have a bowl shape, including the features discussed above, as if the image(s) were projected onto the bowl-shaped projection surface 402.

As indicated above, in some embodiments, the display module 306 may render only the portions of the bowl-shaped image within the field of view of a virtual camera 202 of the in-vehicle computing system 102. Accordingly, although the bowl-shaped image may be embodied as an image "projected" onto a three-dimensional surface, the display 118 may render a two-dimensional perspective of the bowl-shaped image in some embodiments. In the illustrative embodiment, the camera control module 308 determines the perspective of the virtual camera 202 and, in conjunction with the virtual camera control 128, permits a user of the in-vehicle computing system 102 to modify the field of view of the virtual camera 202 of the in-vehicle computing system 102.

As discussed above, the camera system 120 includes a plurality of cameras 126 strategically placed to capture the surroundings of the vehicle 100. Each of the cameras 126 generates an independent image of the scene within its field of view, and the cameras 126 are arranged such that the fields of view of neighboring cameras 126 (i.e., cameras 126 most adjacent one another) have an overlapping scene/region. In some embodiments, the in-vehicle computing system 120 (e.g., via the display module 306) may combine two or more images generated by the cameras 126 to generate combined images (e.g., panoramic images) for projection to the virtual bowl-shaped projection surface 402. For example, the in-vehicle computing system 102 may generate a combined image based on two images captured by neighboring cameras 126 for projection. For convenience, such images may be referred to herein as "neighboring images." In other embodiments, the in-vehicle computing system 120 may project the images to the virtual bowl-shaped projection surface 402 and combine the projections as described below (e.g., by blending, cropping, and/or otherwise modifying the projections in the corresponding overlapping region of the projection surface 402).

The overlap determination module 310 determines an overlapping region of neighboring images. It should be appreciated that the overlap determination module 310 may identify overlapping image regions using any suitable techniques, algorithms, and/or mechanisms. For example, in the illustrative embodiment, the geometry of the camera system 120 and the intrinsic parameters of the cameras 126 are known or otherwise determinable. Accordingly, in some embodiments, the overlapping region may be determined based on such geometry and/or parameters. In other embodiments, the overlapping region may be determined based on feature detection and feature matching algorithms. For example, the overlap determination module 310 may utilize one or more feature detectors/descriptors such as Speeded Up Robust Features (SURF), Scale-Invariant Feature Transform (SIFT), Multi-Scale Oriented Patches (MOPS), Canny, Harris, and/or Sobel filters to detect and describe features of each neighboring image. Further, the overlap determination module 310 may utilize a matching algorithm or technique such as squared differences (SSD), fixed threshold, nearest neighbor, and/or Random Sample Consensus (RANSAC) based on the identified features of the two images (i.e., a stereo image pair) to identify features of the two images that correspond with one another. In other words, the overlap determination module 310 may identify a portion of a scene (e.g., having particular objects, elements, and/or features) that both of the neighboring cameras 126 have captured (i.e., the overlapping region). Of course, the overlap determination module 310 may otherwise determine the overlapping region of neighboring images in other embodiments.

The object identification module 312 identifies one or more objects in the vicinity surrounding the vehicle 100. It should be appreciated that the object identification module 312 may identify an object in the vicinity surrounding the vehicle 100 (e.g., near the vehicle 100) and the location of the object relative to the vehicle 100 or another reference point using any suitable techniques, algorithms, and/or mechanisms. For example, in some embodiments, the objects may be identified using one or more of the optical flow, segmentation, and/or classification techniques described in International Patent Application Serial No. PCT/US2013/076644, filed Dec. 19, 2013. Additionally or alternatively, the object identification module 312 may utilize one or more sensors (e.g., 3D sensors) of the vehicle 100 to identify/locate objects near the vehicle 100. As indicated above, when images captured by neighboring cameras 126 are projected onto a virtual bowl-shaped projection surface, the bowl-shaped surface oftentimes has different projections of a single real-world point, which may cause image ambiguity, duplicity, and/or invisible objects in the surroundings of the vehicle 100. Accordingly, in the illustrative embodiment, the object identification module 312 identifies moving objects in the overlapping region. As described below, the projection of the overlapping image region onto the virtual bowl-shaped projection surface is modified to visualize the identified moving object. Although the techniques and algorithms are primarily described herein in reference to identifying a single object and modifying the projections based on a single object, in some embodiments, the in-vehicle computing system 102 may identify multiple objects and/or modifying the projections based on multiple objects.

As indicated above, the illustrative object identification module 312 includes the movement determination module 316 and the contour determination module 318. The movement determination module 316 determines movement of objects in the vicinity surrounding the vehicle 100. In particular, in the illustrative embodiment, the movement determination module 316 determines movement of objects located in the overlapping image region relative to the cameras 126 that captured the corresponding neighboring images. It should be appreciated that the movement determination module 316 may make such a determination using any suitable techniques, algorithms, and/or mechanisms. For example, the movement determination module 316 may utilize an optical flow algorithm (see, e.g., the optical flow techniques described in International Patent Application Serial No. PCT/US2013/076644, filed Dec. 19, 2013), a set of sequential images taken with the same camera 126, and/or one or more sensors (not shown). In embodiments involving sensors, the sensors may be embodied as or otherwise include, for example, proximity sensors, optical sensors, light sensors, audio sensors, temperature sensors, motion sensors, piezoelectric sensors, and/or other types of sensors. Of course, the in-vehicle computing system 102 may also include components and/or devices configured to facilitate the use of the sensors.

The contour determination module 318 is configured to determine the contour of one or more moving objects identified by the movement determination module 316 for projection to the virtual bowl-shaped projection surface 402. As described below, in the illustrative embodiment, the contour determination module 318 or, more generally, the object identification module 312 selects one of the neighboring fisheye images from which to project the identified moving object (e.g., its contour) to the virtual bowl-shaped projection surface. Accordingly, the contour determination module 318 determines the contour of an identified moving object on the selected fisheye image using a suitable technique, algorithm, and/or mechanisms (e.g., edge detection, image segmentation, and/or other image filters or algorithms). As described below, in some embodiments, the contour determination module 318 may "flood-fill" the contour to make the moving object contrast with other features of the generated bowl-shaped image (e.g., with a bright color). In other embodiments, the contour determination module 318 may identify the image region of the selected fisheye image within the moving object's contour for projection to the virtual bowl-shaped projection surface 402 (e.g., projection onto a blended/transparent overlapping region).

As indicated above, when the images captured by neighboring cameras 126 are projected onto a virtual bowl-shaped projection surface, the bowl-shaped surface oftentimes has different projections of a single real-world point, which when traditionally remedied, may cause image ambiguity, duplicity, and/or invisible objects in the surroundings of the vehicle 100. As such, in the illustrative embodiment, the object visualization module 314 ameliorates object visualization in the overlapping image region. In particular, the object visualization module 314 modifies the projected overlapping image region (i.e., corresponding with the overlapping region of neighboring fisheye images) to visualize the identified moving object on the virtual bowl-shaped projection surface 402. As described above, in some embodiments, the object visualization module 314 modifies the projection itself to visualize the identified moving object, whereas in other embodiments, the object visualization module 314 modifies the neighboring fisheye images and/or process/combined versions thereof for visualization of the identified moving object prior to projection onto the virtual bowl-shaped projection surface 402. Further, as indicated above, in the illustrative embodiment, the object visualization module 314 includes the contour projection module 320 and the junction modification module 322.

The contour projection module 320 blends the overlapping image region of the neighboring images to generate a blended overlapping image region (e.g., on the projection or the combined/processed images themselves) and modifies the blended overlapping image region to visualize the identified moving object's contour in that blended overlapping image region. It should be appreciated that the overlapping image region may be blended using any suitable algorithm, technique, and/or mechanism. For example, in some embodiments, the contour projection module 320 may utilize an averaging or blurring filter (e.g., a Gaussian filter). In other embodiments, the contour projection module 320 may cause the overlapping image region or a portion thereof to be transparent. In the illustrative embodiment, the contour projection module 320 projects the identified moving object's contour onto the blended overlapping image region (e.g., of the bowl-shaped image) such that the object's contour is overlaid on the bowl-shaped image in the blended overlapping image region. As indicated above, in doing so, the contour projection module 320 may project the contour in a variety of ways depending on the particular embodiment. For example, the contour projection module 320 may project a flood-filled (e.g., monochromatic) contour of the object, a highlighted border of the object, or the image region of the selected image within the identified object's contour.

The junction modification module 322 adaptively modifies the junction between neighboring fisheye images for continuous visualization of the identified moving object. For example, in the illustrative embodiment, the junction modification module 322 "moves" the junction as the object moves through the overlapping image region such that the moving object is always projected from one of the neighboring fisheye images. In particular, the junction modification module 322 determines a junction between neighboring fisheye images within the overlapping region based on a location of the identified moving object relative to the corresponding fisheye cameras 126. In the illustrative embodiment, the junction is a border within the overlapping image region at which to combine the neighboring fisheye images. The junction modification module 322 further modifies the neighboring fisheye images within the overlapping region based on the determined junction, combines the modified version of those fisheye images at the junction, and projects the combined version thereof to the virtual bowl-shaped projection surface 402. In particular, in the illustrative embodiment, the junction modification module 322 determines a viewing threshold for one or both of the neighboring fisheye images, selects one of the neighboring fisheye images from which to project the identified moving object to the virtual bowl-shaped projection surface 402 based on the identified moving object's relative location and the viewing threshold, and determines a corresponding region of each of the neighboring fisheye images to project to the virtual bowl-shaped projection surface 402 based on the identified moving object's relative location and the viewing threshold.

Depending on the particular embodiment, the viewing threshold may be associated with, for example, geometry of the camera system 120 and/or intrinsic parameters of the cameras 126. As indicated above, in the illustrative embodiment, the camera system 120 has a specific geometry such that the locations of the cameras 126 relative to one another, fields of view of the cameras 126, and/or overlapping regions of neighboring cameras 126 are known or determinable. Further, each of the cameras 126 has intrinsic parameters associated with, for example, the focal length, principle point, zoom information, maximum/minimum viewing angles, and/or other characteristics of the corresponding camera 126. It should be appreciated that a particular camera 126 has a maximum viewing angle at which the camera 126 has its largest field of view and therefore captures a larger scene. For example, in some embodiments, a fisheye camera 126 may be configured to capture nearly 180 degrees. In the illustrative embodiment, the junction modification module 322 may adjust the viewing angle of a camera 126 to capture a scene smaller than its capability, for example, by adjusting (i.e., reducing) the viewing angle of the camera 126. Further, in some embodiments, the junction modification module 322 may crop or otherwise modify images captured by a particular camera 126 such that the images can be combined at the determined junction. In other words, as described below, the junction modification module 322 determines a border within the overlapping image region at which the neighboring fisheye images are to be combined or joined. Without modification, a portion of each neighboring fisheye image likely extends beyond the junction, so the junction modification module 322 configures the neighboring fisheye images to be combined (e.g., by adjusting their viewing angle prior to capture or modifying the images following capture) and combines those images.

Figure 7:
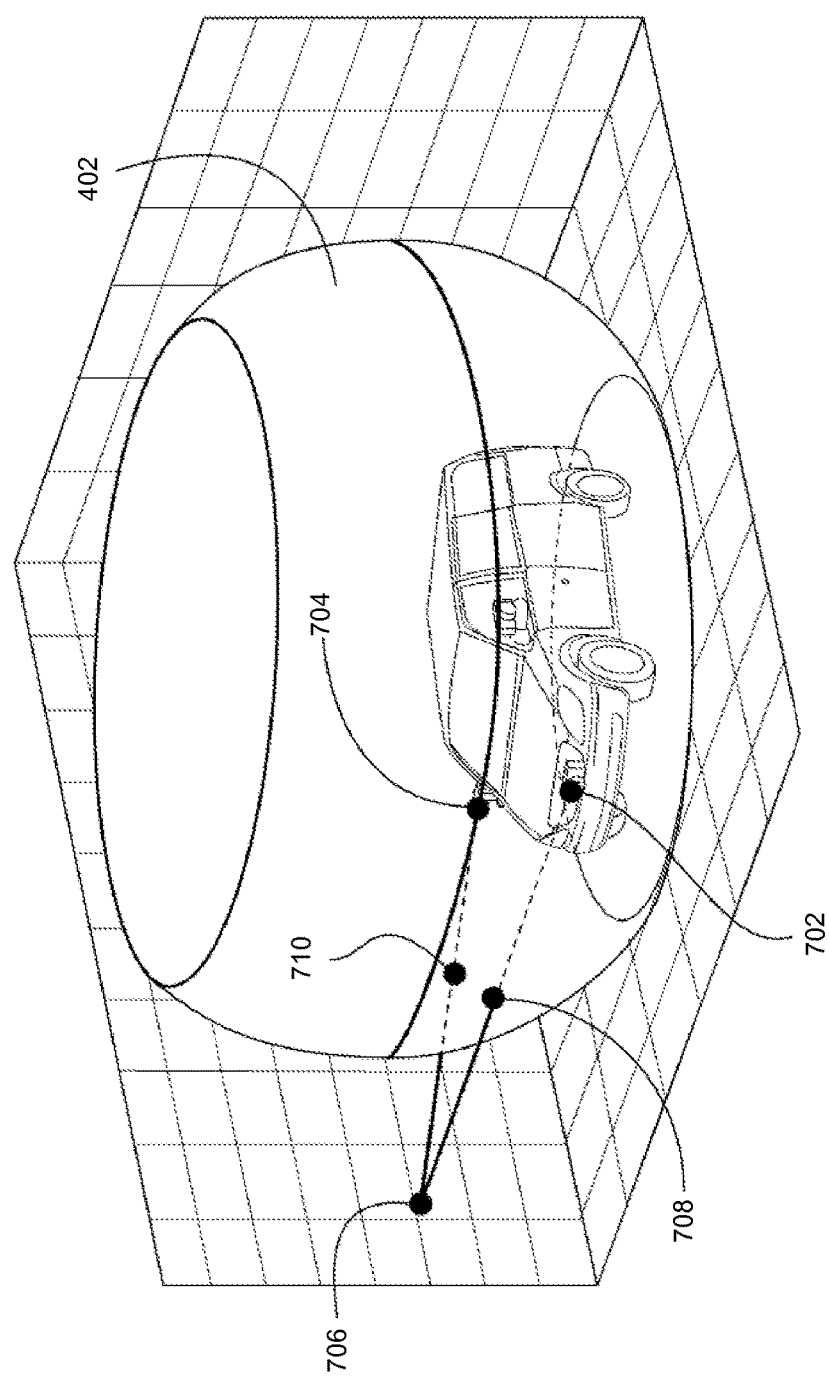
FIG. 7 is a simplified illustration of at least one embodiment of a projection of an object onto the virtual bowl-shaped projection surface of FIG. 4.

As discussed above, the in-vehicle computing system 102 generates a virtual bowl-shaped projection surface 402 to which the captured images and/or combined images may be projected for the convenience and improved vision of the driver of the vehicle 100. Additionally, neighboring cameras 126 have fields of view that overlap, which causes the images generated by the neighboring cameras 126 to have features that match (i.e., are duplicated) in the overlapping image region. Such duplication of features can result in ambiguity of such features in the combined image and/or corresponding projections if not addressed. For example, as shown in FIG. 7, two neighboring cameras 702, 704 project (e.g., via back projection) the same real-world point 706 onto two different points 708, 710 of a bowl-shaped projection surface 402 (i.e., unless that real-world point 706 is coincident with the bowl-shaped projection surface 402). In particular, the real-world point 706 as captured by the first camera 702 is projected onto the bowl-shaped projection surface 402 at a first point 708 and the real-world point 706 as captured by the second camera 702 is projected onto the bowl-shaped surface at a second point 710. As such, in the illustrative embodiment, the in-vehicle computing system 102 addresses those issues to ensure that the object (and only one copy of the object) is visible in a particular overlapping image region.

Figure 8:
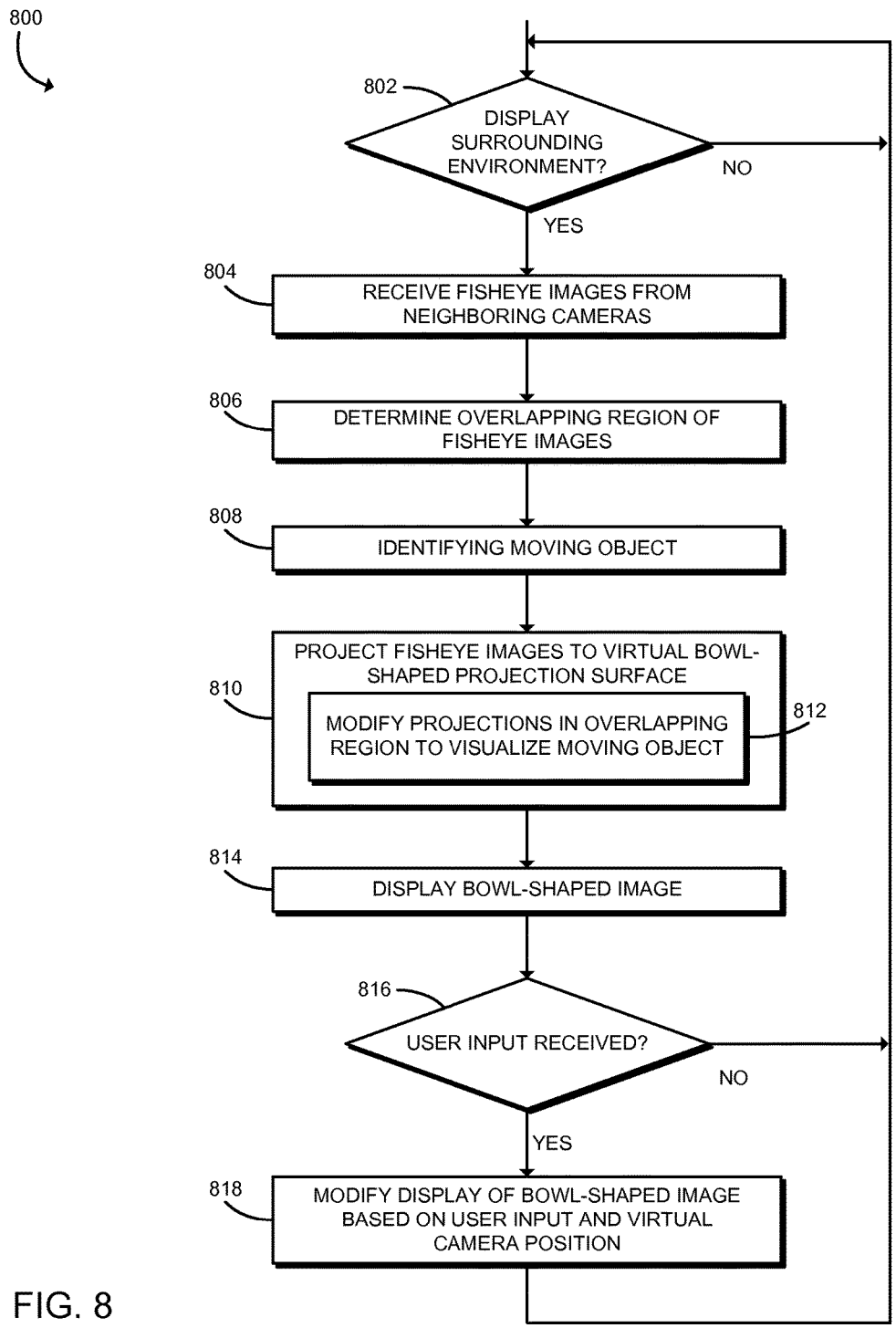
FIG. 8 is a simplified flow diagram of at least one embodiment of a method for visualizing moving objects on a bowl-shaped image by the in-vehicle computing system of FIG. 1.

Referring now to FIG. 8, in use, the in-vehicle computing system 102 may execute a method 800 for visualizing moving objects on a bowl-shaped image or, more particularly, on a region of the bowl-shaped image region corresponding with an overlapping region of neighboring fisheye images. As discussed above, the methods described herein are generally described with respect to fisheye cameras 126 and fisheye images generated by such cameras 126; however the methods are also applicable to other types of cameras 126 and/or images. The illustrative method 800 begins with block 802 in which the in-vehicle computing system 102 determines whether to display the surrounding physical environment. If so, the in-vehicle computing system 102 receives fisheye images from adjacent/neighboring fisheye cameras 126 in block 804. As discussed above, in the illustrative embodiment (see FIG. 2), the camera system 120 includes four fisheye cameras 126. Accordingly, although the method 800 is described in reference to two neighboring fisheye images, in such an embodiment, the in-vehicle computing system 102 may receive fisheye images from each of the four cameras 126 associated with the same capture time (i.e., captured at the same time or approximately the same time). Of course, in other embodiments, the camera system 120 may include a different number of cameras 126 and therefore a different number of fisheye images may be received or retrieved in block 804.

In block 806, the in-vehicle computing system 102 determines an overlapping region of the neighboring fisheye images. As described above, the in-vehicle computing system 102 may determine the overlapping image region based on, for example, the geometry of the camera system 120, the intrinsic parameters of the cameras 126, feature detection and matching algorithms, and/or other suitable techniques, algorithms, or mechanisms. In block 808, the in-vehicle computing system 102 identifies a moving object in the vicinity surrounding the vehicle 100. As indicated above, objects outside the overlapping regions of adjacent fisheye cameras 126 are projected to a single location on the virtual bowl-shaped projection surface 402 and, therefore, do not generally raise the issues regarding object ambiguity, duplicity, and invisibility described above. Accordingly, in the illustrative embodiment, the in-vehicle computing system 102 identifies moving objects, if any, in an overlapping image region of neighboring fisheye cameras 126. It should be appreciated that the in-vehicle computing system 102 may utilize any suitable techniques, algorithms, and/or mechanisms for doing so (e.g., optical flow, image segmentation, object classification, sensors, etc.).

In block 810, the in-vehicle computing system 102 projects the received fisheye images to the virtual bowl-shaped projection surface 402 to generate a corresponding bowl-shaped image. Of course, in other embodiments, the in-vehicle computing system 102 may project the fisheye images to a different virtual bowl-shaped projection surface (e.g., a surface having different characteristics). Further, as discussed above, in some embodiments, the one or more images may be modified to have a bowl shape consistent with the virtual bowl-shaped projection surface 402 rather than be "projected" onto the bowl-shaped projection surface 402 in the traditional sense. As indicated above, in block 812, the in-vehicle computing system 102 modifies the projections in the overlapping region to visualize the moving object identified in block 808. In doing so, the in-vehicle computing system 102 may project a contour of the identified moving object as described below in reference to the method 900 of FIG. 9 or modify the junction between adjacent images as described below in reference to method 1000 of FIG. 10. In other embodiments, the in-vehicle computing system 102 may utilize other techniques for visualizing the moving object in the overlapping region. Further, as indicated above, in some embodiments, the in-vehicle computing system 102 may modify the fisheye images or processed images thereof (e.g., combined images) prior to projection to the virtual bowl-shaped projection surface 402 rather than modifying the projection itself.

In block 814, the in-vehicle computing system 102 displays the bowl-shaped image (i.e., including the modified overlapping image region) for the driver to view. As indicated above, depending on the particular embodiment, the in-vehicle computing system 102 may display the entirety of the bowl-shaped image or only a portion of bowl-shaped image. For example, in some embodiments, the in-vehicle computing system 102 may only generate and/or display a portion of the bowl-shaped image and/or bowl-shaped projection surface 402 within the field of view of, and from the same perspective as, the virtual camera 202.

As discussed above, in some embodiments, a user (e.g., the driver) may control the virtual camera 202 to adjust its field of view of the bowl-shaped image. Accordingly, in block 816, the in-vehicle computing system 102 may determine whether any user input has been received (e.g., from the driver) to modify the field of view of the virtual camera 202 (e.g., by translating or rotating the virtual camera 202). If so, the in-vehicle computing system 102 modifies the display of the bowl-shaped image based on the user input and the new position of the virtual camera 202 in block 818. For example, the user may rotate the virtual camera 202 within the bowl-shaped image (e.g., from a perspective consistent with that inside the vehicle 100) to display a different part of the bowl-shaped image. It should be appreciated that, in some embodiments, the in-vehicle computing system 102 may utilize multiple virtual cameras 202 (e.g., to display multiple perspectives of the bowl-shaped image simultaneously). For example, in one embodiment, the in-vehicle computing system 102 may display a view of the bowl-shaped image from each of the four sides of the vehicle 100. In other embodiments, the entire bowl-shaped image or a portion thereof may be displayed on a 3D display as discussed above. In response to modifying the display of the bowl-shaped image (in block 818) or determining that no user input has been received to modify the bowl-shaped image (in block 816), the method 800 returns to block 802 in which the in-vehicle computing system 102 determines whether to display the surrounding environment of the vehicle 100.

Figure 9:
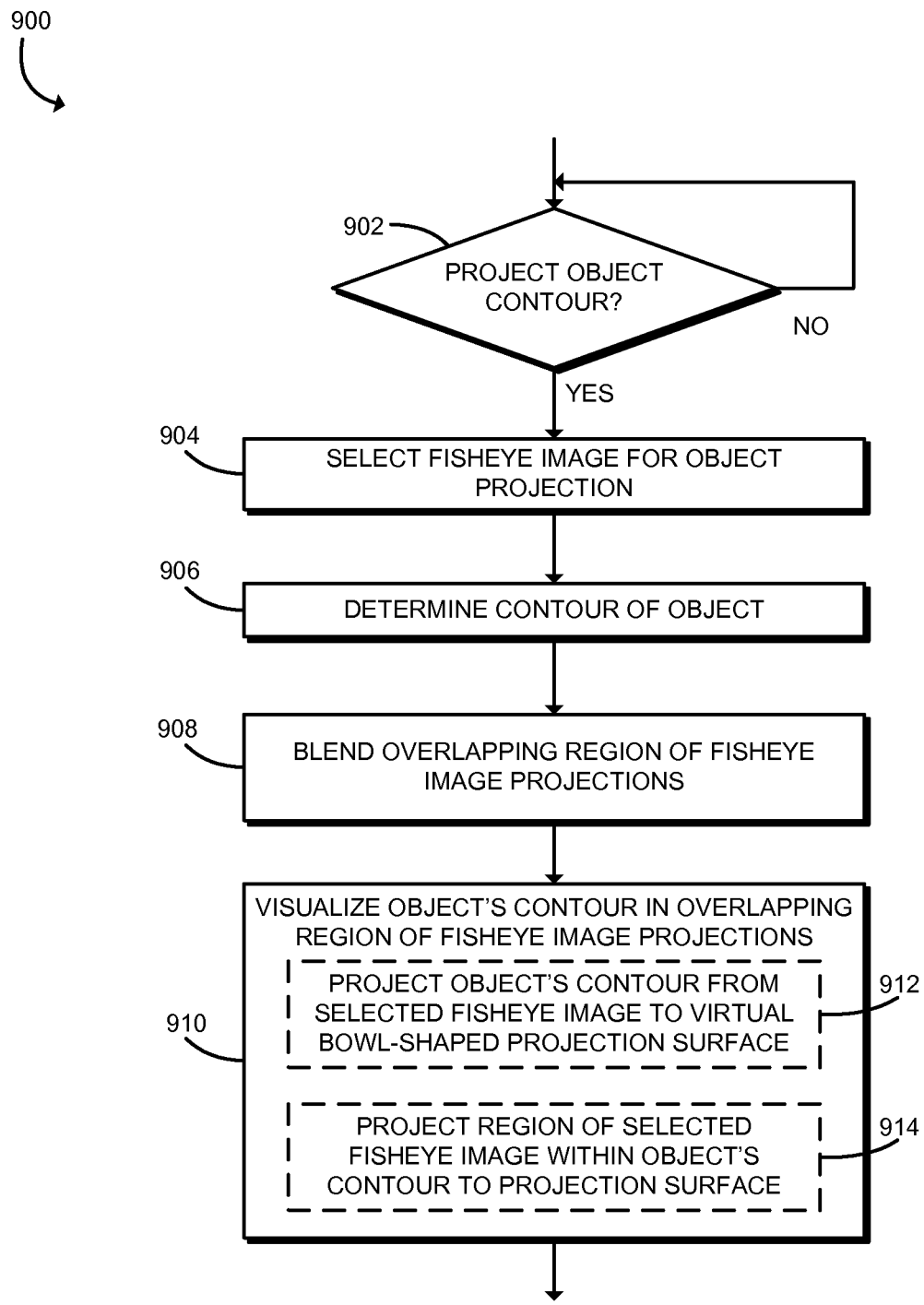
FIG. 9 is a simplified flow diagram of at least one embodiment of a method for projecting a contour of a moving object to visualize the moving object by the in-vehicle computing system of FIG. 1.

Referring now to FIG. 9, in use, the in-vehicle computing system 102 may execute a method 900 for modifying projections in an overlapping region 1102 (see FIG. 11) to visualize a moving object by projecting the object's contour onto the overlapping region 1102 of the virtual bowl-shaped projection surface 402 as indicated above. The illustrative method 900 begins with block 902 in which the in-vehicle computing system 102 determines whether to project the contour 1104 (see FIG. 11) of a moving object identified in block 808 of FIG. 8 onto the virtual bowl-shaped projection surface 402. If so, in block 904, the in-vehicle computing system 102 selects one of the neighboring fisheye images from which to project the identified moving object to the virtual bowl-shaped projection surface 402. For example, in some embodiments, the in-vehicle computing system 102 may select the fisheye image captured by the fisheye camera 126 nearest the identified moving object. Of course, the in-vehicle computing system 102 may determine which of the adjacent fisheye images to select for projection of the identified moving object based on different criteria in other embodiments.

In block 906, the in-vehicle computing system 102 determines the contour 1104 of the identified moving object on the selected fisheye image. As indicated above, the in-vehicle computing system 102 may utilize any suitable technique, algorithm, and/or mechanism for doing so. For example, the in-vehicle computing system 102 may utilize an edge detection algorithm (e.g., Canny edge detection, Sobel filters, etc.), an image segmentation algorithm (e.g., watershed segmentation, pyramid segmentation, etc.), and/or other image filters/algorithms to determine the object's contour. It should be appreciated that, in the illustrative embodiment, the object's contour 1104 is projected from only one of the neighboring fisheye images. However, in other embodiments, the object's contour 1104 may be identified in each of the neighboring fisheye images and/or may be projected from both fisheye images.

In block 908, the in-vehicle computing system 102 blends the overlapping region 1102 of the fisheye image projections (i.e., the projection of the overlapping image region onto the virtual bowl-shaped projection surface 402). As discussed above, in some embodiments, the in-vehicle computing system 102 may apply an averaging or blurring filter to the overlapping image region (e.g., a Gaussian filter) to blend the overlapping region 1102 of the fisheye image projections. Alternatively or additionally, the in-vehicle computing system 102 may render a portion of the overlapping region as a transparent region.

Figure 11:
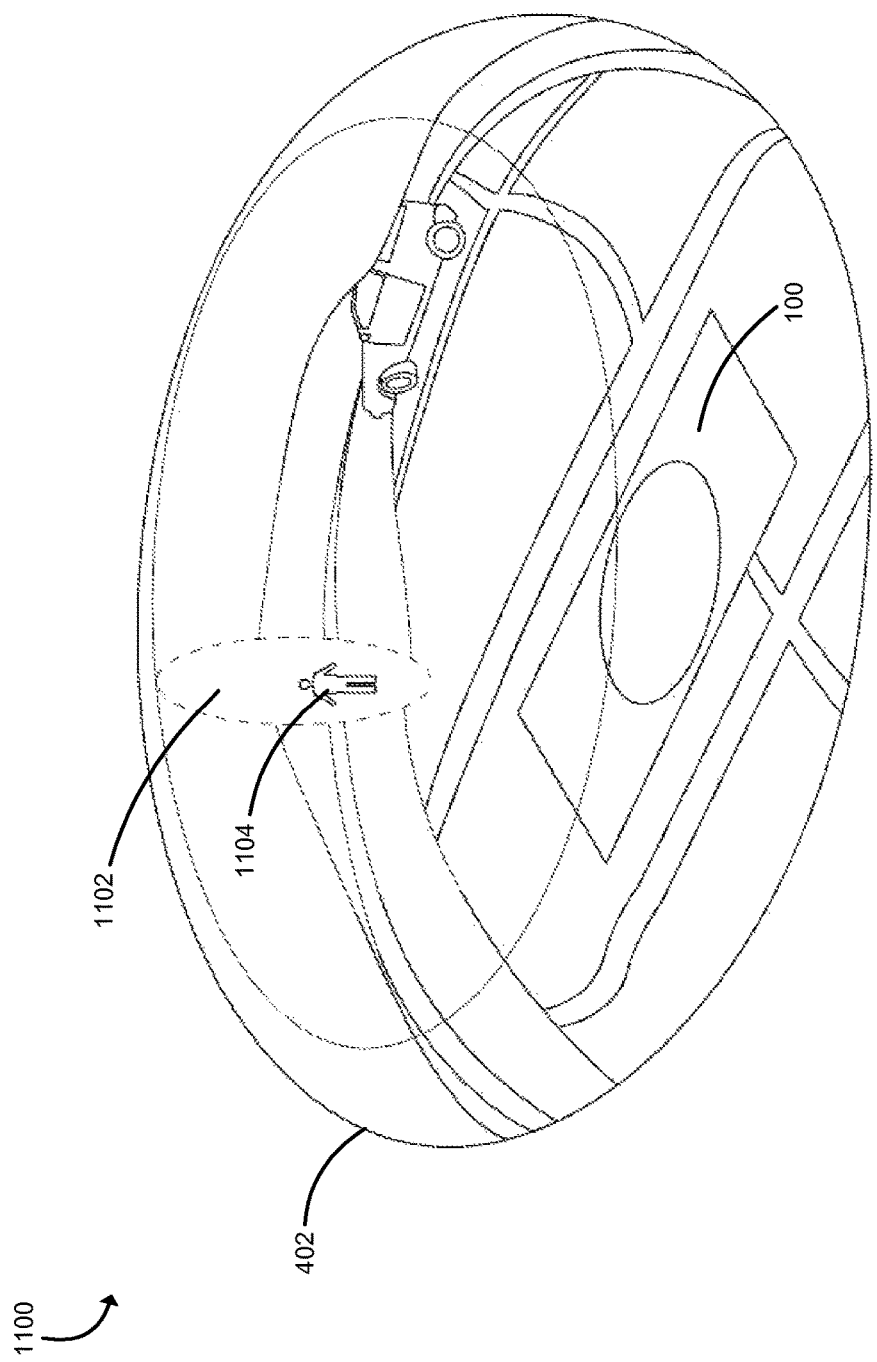
FIG. 11 is a simplified illustration of at least one embodiment of a projection of a moving object's contour onto the virtual bowl-shaped projection surface of FIG. 4.

In block 910, the in-vehicle computing system 102 visualizes the object's contour 1104 in the overlapping region of the fisheye image projections (e.g., in the corresponding location). As indicated above, the in-vehicle computing system 102 may do so in a number of ways depending on the particular embodiment. For example, in block 912, the in-vehicle computing system 102 may project the object's contour 1104 from the selected fisheye image to the virtual bowl-shaped projection surface 402. As indicated above, the outline or border of the object defined by its contour 1104 may be projected to the overlapping region of the virtual bowl-shaped projection surface 402 in some embodiments (e.g., as a highlighted border). In other embodiments, the in-vehicle computing system 102 may flood-fill the contour 1104 (e.g., using a watershed algorithm or other segmentation algorithm) and project the flood-filled contour 1104 from the selected fisheye image onto the overlapping region. Alternatively or additionally, in block 914, the in-vehicle computing system 102 may identify the image region of the selected fisheye image within the moving object's contour 1104 and project that image region from the selected fisheye image to the overlapping region 1102 of the virtual bowl-shaped projection surface 402. As indicated above, in some embodiments, projecting the object's contour 1104 to the virtual bowl-shaped projection surface 402 essentially involves overlaying the object's contour 1104 on the blended overlapping region 1102 in the appropriate location (e.g., the location at which the corresponding image pixels would ordinarily be projected to the surface 402). Although the overlapping region 1102 is shown in FIG. 11 as being blended in its entirety, in some embodiments, only a portion of the overlapping region 1102 is blended.

Figure 2:
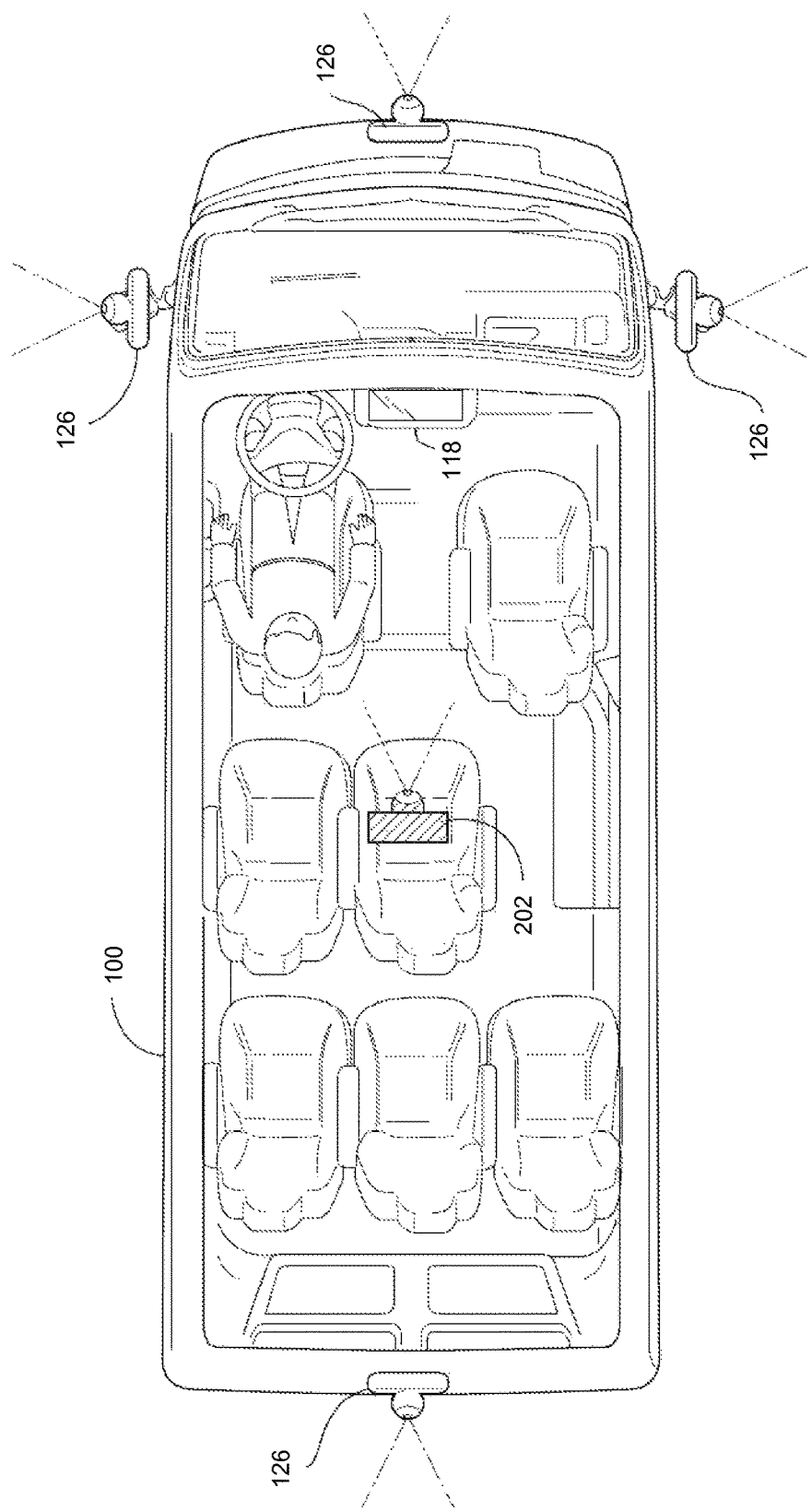
FIG. 2 is a simplified illustration of at least one embodiment of the vehicle of FIG. 1.
Figure 10:
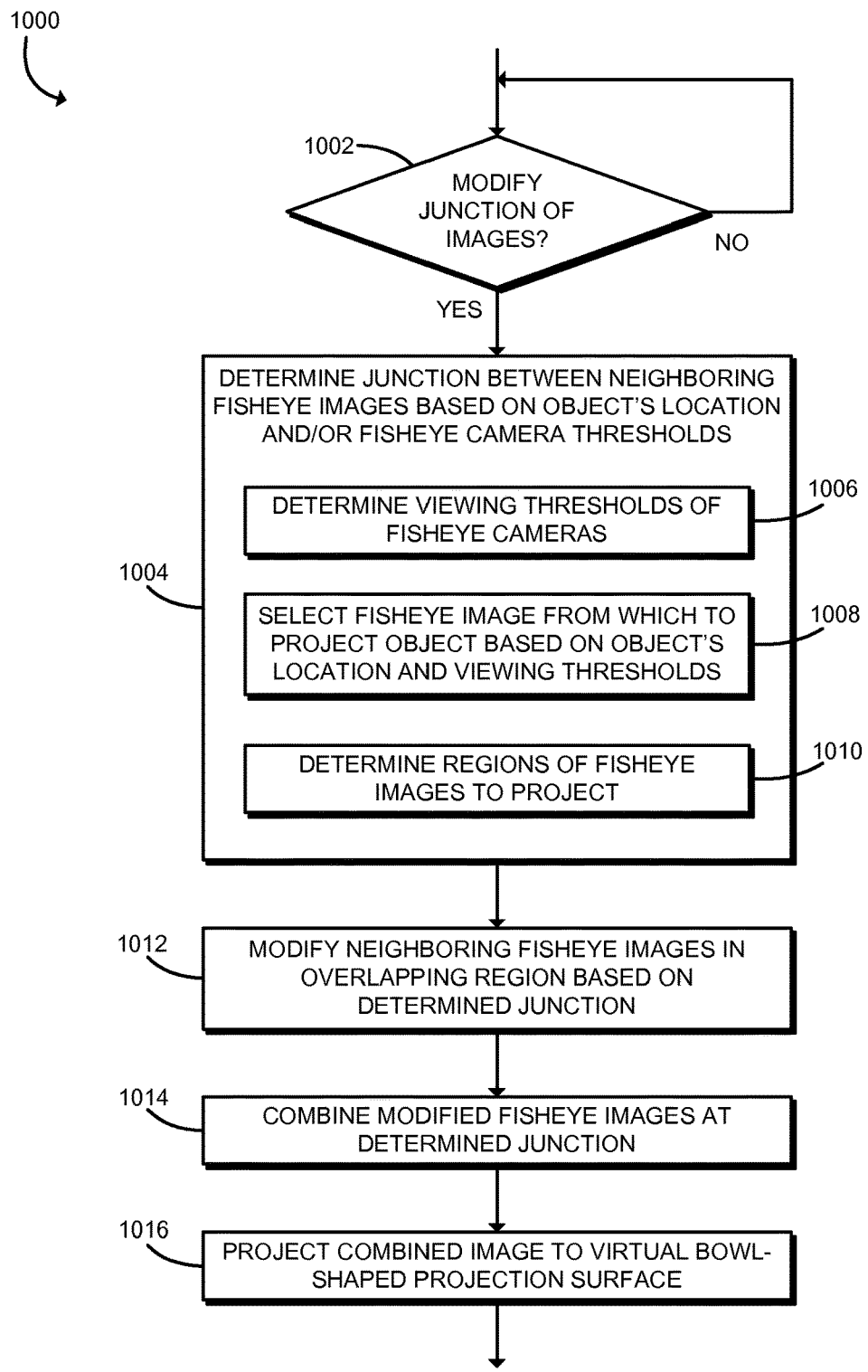
FIG. 10 is a simplified flow diagram of at least one embodiment of a method for modifying a junction between adjacent images to visualize the moving object by the in-vehicle computing system of FIG. 1.
Figure 12:
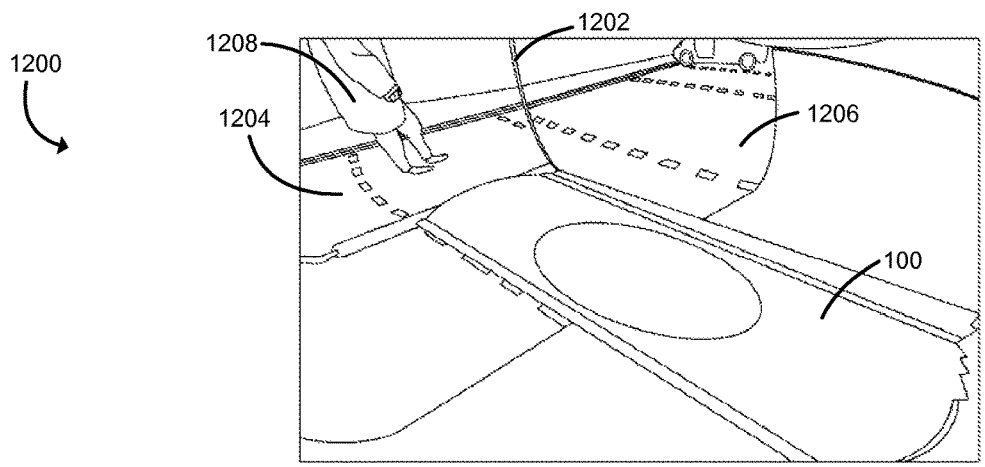
FIGS. 12-14 are simplified illustrations of images of projections having modified junctions based on the method of FIG. 10.

Referring now to FIG. 10, in use, the in-vehicle computing system 102 may execute a method 1000 for modifying a junction 1202 (see FIG. 12) between neighboring fisheye images 1204, 1206 to visualize an identified moving object 1208. As indicated above, the in-vehicle computing system 102 adaptively moves the junction 1202 as the object 1208 moves through the overlapping region such that the moving object 1208 is always projected from one of the neighboring fisheye images 1204, 1206. For example, as shown in FIG. 2, fisheye cameras 126 are positioned at the front and the front right of the vehicle 100 in the illustrative embodiment. If the object 1208 (e.g., a pedestrian) moves from left to right across the front of the vehicle 100, the in-vehicle computing system 102 may move the junction 1202 between the fisheye images 1204, 1206 to the right (e.g., by adjusting the viewing angles of the corresponding cameras 126 or modifying the captured images of the cameras 126).

The illustrative method 1000 begins with block 1002 in which the in-vehicle computing system 102 determines whether to modify the junction 1202 of the neighboring fisheye images 1204, 1206. If so, in block 1004, the in-vehicle computing system 102 determines a junction 1202 between the neighboring fisheye images 1204, 1206 based on the object's location and/or one or more thresholds of the corresponding fisheye cameras 126 (i.e., the cameras 126 that captured the fisheye images 1204, 1206). In particular, in block 1006, the in-vehicle computing system 102 determines the viewing thresholds of the neighboring fisheye cameras 126 (i.e., the cameras 126 that generated the images 1204, 1206). As described above, each fisheye camera 126 has a maximum viewing angle (e.g., approximately 180 degrees) and minimum viewing angle (e.g., approximately zero degrees) at which the camera 126 is able to capture images, which depends on the particular camera 126 and its intrinsic parameters.

In block 1008, the in-vehicle computing system 102 selects one of the neighboring fisheye images 1204, 1206 from which to project the identified moving object 1208 based on the identified moving object's relative location and the viewing thresholds of the cameras 126. For example, in some embodiments, the object 1208 is projected from the fisheye image 1204, 1206 corresponding with the camera 126 nearest the object 1208 provided the object 1208 is not outside the viewing thresholds of that camera 126.

Figure 13:
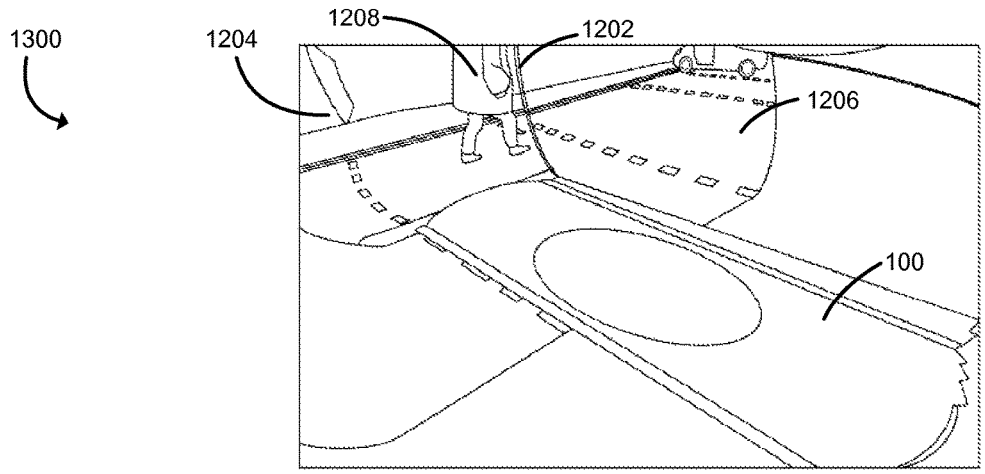
Figure 14:
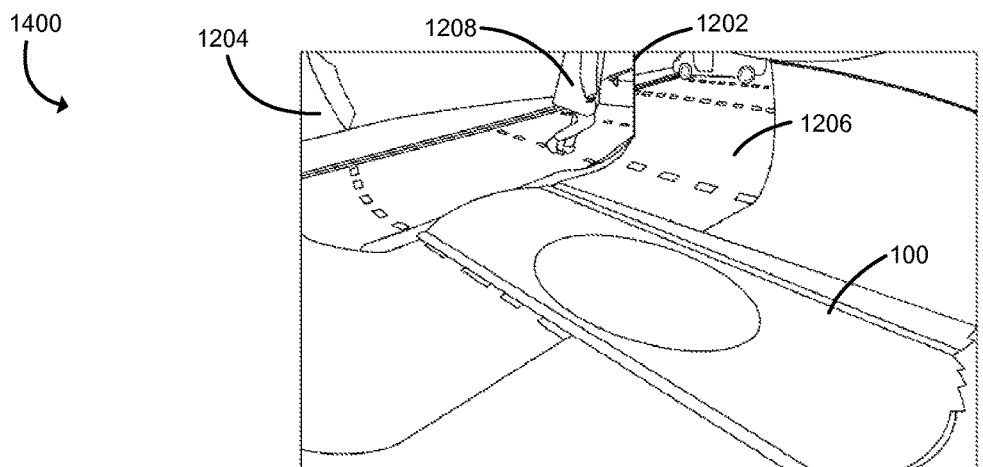

In block 1010, the in-vehicle computing system 102 determines the corresponding regions of the fisheye images 1204, 1206 to project to the virtual bowl-shaped projection surface 402. For example, without modifying the junction 1202 between the fisheye images 1204, 1206, the junction 1202 may ordinarily correspond with a location approximately halfway between the corresponding cameras 126. However, if the object 1208 is located near or intersecting the junction 1202, the in-vehicle computing system 102 may move the junction 1202 to the side of the object 1208. For example, in some embodiments, the junction 1202 is moved in the direction the object 1208 is moving and, in other embodiments, the junction 1202 is moved so that the object 1208 is projected from the image 1204, 1206 nearest the center of the object 1208. In either case, the in-vehicle computing system 102 determines the corresponding region of each of the fisheye images 1204, 1206 that should be projected to result in the two images 1204, 1206 being joined at the determined location of the junction 1202. In block 1012, the in-vehicle computing system 102 modifies the neighboring fisheye images 1204, 1206 in the overlapping region based on the determined junction 1202 and/or the determined regions to project. For example, in the embodiment described above and shown in FIGS. 12-14 in which the object 1208 is moving from left to right across the front of the vehicle 100, the viewing angle of the image 1204 captured by the front camera 126 may be increased (at least to the right side) and the viewing angle of the image 1206 captured by the right camera 126 may be decreased (at least toward the front) and the images captured by those cameras 126 with be similarly effected. In another embodiment, the in-vehicle computing system 102 may not adjust the viewing angles of the cameras 126 but may instead crop or otherwise modify the images 1204, 1206 to result in images 1204, 1206 that can be joined/combined at the determined junction 1202.

In block 1014, the in-vehicle computing system 102 combines the modified fisheye images 1204, 1206 at the determined junction to generate a combined image. In block 1016, the in-vehicle computing system 102 projects the combined image to the virtual bowl-shaped projection surface 402 to generate a corresponding bowl-shaped image. As indicated above, in some embodiments, rather than modifying the junction 1202 between the images 1204, 1206 prior to projection, the in-vehicle computing system 102 may modify the prospective (i.e., unmodified) projections of the images 1204, 1206 to modify the junction between the projections. Further, it should be appreciated that the in-vehicle computing system 102 may consider the locations of multiple moving objects in determining whether to modify the junction between neighboring fisheye images. Additionally, the in-vehicle computing system 102 may modify the junction between each pair of neighboring images in which a moving object has been identified in the corresponding overlapping region of those neighboring images.

EXAMPLES

Illustrative examples of the technologies disclosed herein are provided below. An embodiment of the technologies may include any one or more, and any combination of, the examples described below.

Example 1 includes a computing device for visualizing moving objects on a bowl-shaped image, the computing device comprising a first fisheye camera to capture a first fisheye image including a first scene; a second fisheye camera to capture a second fisheye image including a second scene overlapping with the first scene at an overlapping region; an object identification module to identify a moving object in the overlapping region; and an object visualization module to modify a projected overlapping image region to visualize the identified moving object on a virtual bowl-shaped projection surface, wherein the projected overlapping image region is projected on the virtual bowl-shaped projection surface and corresponds with the overlapping region of the first and second fisheye images.

Example 2 includes the subject matter of Example 1, and wherein to modify the projected overlapping image region comprises to select a fisheye image from which to project the identified moving object to the virtual bowl-shaped projection surface, wherein the fisheye image is selected from one of the first fisheye image or the second fisheye image; determine a contour of the identified moving object on the selected fisheye image; blend the projected overlapping image region to generate a blended overlapping image region; and visualize the identified moving object's contour in the blended overlapping image region.

Example 3 includes the subject matter of any of Examples 1 and 2, and wherein to visualize the identified moving object's contour comprises to project the identified moving object's contour from the selected fisheye image to the blended overlapping image region of the virtual bowl-shaped projection surface.

Example 4 includes the subject matter of any of Examples 1-3, and wherein to visualize the identified moving object's contour comprises to identify an image region of the selected fisheye image within the identified moving object's contour; and project the identified image region to the blended overlapping image region of the virtual bowl-shaped projection surface to overlay the identified image region on the blended overlapping image region.

Example 5 includes the subject matter of any of Examples 1-4, and wherein the blended overlapping image region of the virtual bowl-shaped projection surface is transparent.

Example 6 includes the subject matter of any of Examples 1-5, and wherein to modify the projected overlapping image region comprises to determine a junction between the first and second fisheye images within the overlapping region of the first and second fisheye images based on a location of the identified moving object relative to the first and second fisheye cameras, wherein the junction is a border within the overlapping image region at which to combine the first and second fisheye images; modify the first and second fisheye images within the overlapping region based on the determined junction; combine the modified first and second fisheye images at the determined junction; and project the combined first and second fisheye images to the virtual bowl-shaped projection surface.

Example 7 includes the subject matter of any of Examples 1-6, and wherein to determine the junction between the first and second fisheye images comprises to determine a corresponding viewing threshold of each of the first and second fisheye cameras; select a fisheye image from which to project the identified moving object to the virtual bowl-shaped projection surface based on the identified moving object's relative location and the viewing threshold, wherein the fisheye image is selected from one of the first fisheye image or the second fisheye image; and determine a corresponding region of each of the first and second fisheye images to project to the virtual bowl-shaped projection surface based on the identified moving object's relative location and the viewing threshold.

Example 8 includes the subject matter of any of Examples 1-7, and wherein the corresponding viewing threshold indicates a maximum and minimum viewing angle that each of the corresponding first and second fisheye cameras is able to capture.

Example 9 includes the subject matter of any of Examples 1-8, and further including an overlap determination module to determine an overlapping image region of the first and second fisheye images corresponding with the overlapping image region based on a geometry of a camera system including the first and second fisheye cameras.

Example 10 includes the subject matter of any of Examples 1-9, and further including a bowl generation module to generate a bowl-shaped image based on the projection of the modified projected overlapping image region to the virtual bowl-shaped projection surface; and a display module to display the generated bowl-shaped image on a display of the computing device.

Example 11 includes the subject matter of any of Examples 1-10, and wherein the computing device is embodied as an in-vehicle computing system.

Example 12 includes a method for visualizing moving objects on a bowl-shaped image generated by a computing device, the method comprising receiving, by the computing device, (i) a first fisheye image generated by a first fisheye camera and capturing a first scene and (ii) a second fisheye image generated by a second fisheye camera and capturing a second scene overlapping with the first scene at an overlapping region; identifying, by the computing device, a moving object in the overlapping region; and modifying, by the computing device, a projected overlapping image region to visualize the identified moving object on a virtual bowl-shaped projection surface, wherein the projected overlapping image region is projected on the virtual bowl-shaped projection surface and corresponds with the overlapping region captured in the first and second fisheye images.

Example 13 includes the subject matter of Example 12, and wherein modifying the projected overlapping image region comprises selecting a fisheye image from which to project the identified moving object to the virtual bowl-shaped projection surface, wherein the fisheye image is selected from one of the first fisheye image or the second fisheye image; determining a contour of the identified moving object on the selected fisheye image; blending the projected overlapping image region to generate a blended overlapping image region; and visualizing the identified moving object's contour in the blended overlapping image region.

Example 14 includes the subject matter of any of Examples 12 and 13, and wherein visualizing the identified moving object's contour comprises projecting the identified moving object's contour from the selected fisheye image to the blended overlapping image region of the virtual bowl-shaped projection surface.

Example 15 includes the subject matter of any of Examples 12-14, and wherein visualizing the identified moving object's contour comprises identifying an image region of the selected fisheye image within the identified moving object's contour; and projecting the identified image region to the blended overlapping image region of the virtual bowl-shaped projection surface to overlay the identified image region on the blended overlapping image region.

Example 16 includes the subject matter of any of Examples 12-15, and wherein the blended overlapping image region of the virtual bowl-shaped projection surface is transparent.

Example 17 includes the subject matter of any of Examples 12-16, and wherein modifying the projected overlapping image region comprises determining a junction between the first and second fisheye images within the overlapping region of the first and second fisheye images based on a location of the identified moving object relative to the first and second fisheye cameras, wherein the junction is a border within the overlapping image region at which to combine the first and second fisheye images; modifying the first and second fisheye images within the overlapping region based on the determined junction; combining the modified first and second fisheye images at the determined junction; and projecting the combined first and second fisheye images to the virtual bowl-shaped projection surface.

Example 18 includes the subject matter of any of Examples 12-17, and wherein determining the junction between the first and second fisheye images comprises determining a corresponding viewing threshold of each of the first and second fisheye cameras; selecting a fisheye image from which to project the identified moving object to the virtual bowl-shaped projection surface based on the identified moving object's relative location and the viewing threshold, wherein the fisheye image is selected from one of the first fisheye image or the second fisheye image; and determining a corresponding region of each of the first and second fisheye images to project to the virtual bowl-shaped projection surface based on the identified moving object's relative location and the viewing threshold.

Example 19 includes the subject matter of any of Examples 12-18, and wherein the corresponding viewing threshold indicates a maximum and minimum viewing angle that each of the corresponding first and second fisheye cameras is able to capture.

Example 20 includes the subject matter of any of Examples 12-19, and further including determining, by the computing device, an overlapping image region of the first and second fisheye images corresponding with the overlapping image region based on a geometry of a camera system including the first and second fisheye cameras.

Example 21 includes the subject matter of any of Examples 12-20, and further including generating, by the computing device, a bowl-shaped image based on the projection of the modified projected overlapping image region to the virtual bowl-shaped projection surface; and displaying the generated bowl-shaped image on a display of the computing device.

Example 22 includes the subject matter of any of Examples 12-21, and wherein the computing device is embodied as an in-vehicle computing system.

Example 23 includes a computing device comprising a processor; and a memory having stored therein a plurality of instructions that when executed by the processor cause the computing device to perform the method of any of Examples 12-22.

Example 24 includes one or more machine-readable storage media comprising a plurality of instructions stored thereon that, in response to execution by a computing device, cause the computing device to perform the method of any of Examples 12-22.

Example 25 includes a computing device for visualizing moving objects on a bowl-shaped image, the computing device comprising means for receiving (i) a first fisheye image generated by a first fisheye camera and capturing a first scene and (ii) a second fisheye image generated by a second fisheye camera and capturing a second scene overlapping with the first scene at an overlapping region; means for identifying a moving object in the overlapping region; and means for modifying a projected overlapping image region to visualize the identified moving object on a virtual bowl-shaped projection surface, wherein the projected overlapping image region is projected on the virtual bowl-shaped projection surface and corresponds with the overlapping region captured in the first and second fisheye images.

Example 26 includes the subject matter of Example 25, and wherein the means for modifying the projected overlapping image region comprises means for selecting a fisheye image from which to project the identified moving object to the virtual bowl-shaped projection surface, wherein the fisheye image is selected from one of the first fisheye image or the second fisheye image; means for determining a contour of the identified moving object on the selected fisheye image; means for blending the projected overlapping image region to generate a blended overlapping image region; and means for visualizing the identified moving object's contour in the blended overlapping image region.

Example 27 includes the subject matter of any of Examples 25 and 26, and wherein the means for visualizing the identified moving object's contour comprises means for projecting the identified moving object's contour from the selected fisheye image to the blended overlapping image region of the virtual bowl-shaped projection surface.

Example 28 includes the subject matter of any of Examples 25-27, and wherein the means for visualizing the identified moving object's contour comprises means for identifying an image region of the selected fisheye image within the identified moving object's contour; and means for projecting the identified image region to the blended overlapping image region of the virtual bowl-shaped projection surface to overlay the identified image region on the blended overlapping image region.

Example 29 includes the subject matter of any of Examples 25-28, and wherein the blended overlapping image region of the virtual bowl-shaped projection surface is transparent.

Example 30 includes the subject matter of any of Examples 25-29, and wherein the means for modifying the projected overlapping image region comprises means for determining a junction between the first and second fisheye images within the overlapping region of the first and second fisheye images based on a location of the identified moving object relative to the first and second fisheye cameras, wherein the junction is a border within the overlapping image region at which to combine the first and second fisheye images; means for modifying the first and second fisheye images within the overlapping region based on the determined junction; means for combining the modified first and second fisheye images at the determined junction; and means for projecting the combined first and second fisheye images to the virtual bowl-shaped projection surface.

Example 31 includes the subject matter of any of Examples 25-30, and wherein the means for determining the junction between the first and second fisheye images comprises means for determining a corresponding viewing threshold of each of the first and second fisheye cameras; means for selecting a fisheye image from which to project the identified moving object to the virtual bowl-shaped projection surface based on the identified moving object's relative location and the viewing threshold, wherein the fisheye image is selected from one of the first fisheye image or the second fisheye image; and means for determining a corresponding region of each of the first and second fisheye images to project to the virtual bowl-shaped projection surface based on the identified moving object's relative location and the viewing threshold.

Example 32 includes the subject matter of any of Examples 25-31, and wherein the corresponding viewing threshold indicates a maximum and minimum viewing angle that each of the corresponding first and second fisheye cameras is able to capture.

Example 33 includes the subject matter of any of Examples 25-32, and further including means for determining an overlapping image region of the first and second fisheye images corresponding with the overlapping image region based on a geometry of a camera system including the first and second fisheye cameras.

Example 34 includes the subject matter of any of Examples 25-33, and further including means for generating a bowl-shaped image based on the projection of the modified projected overlapping image region to the virtual bowl-shaped projection surface; and means for displaying the generated bowl-shaped image on a display of the computing device.

Example 35 includes the subject matter of any of Examples 25-34, and wherein the computing device is embodied as an in-vehicle computing system.

The invention claimed is:

1. A computing device for visualizing moving objects on a bowl-shaped image, the computing device comprising:
   a first fisheye camera to capture a first fisheye image including a first scene;
   a second fisheye camera to capture a second fisheye image including a second scene, wherein the second scene overlaps with the first scene at an overlapping region;
   an object identification module to identify a moving object in the overlapping region; and
   an object visualization module to:
      select a fisheye image from which to project the identified moving object to a virtual bowl-shaped projection surface, wherein the fisheye image is selected from one of the first fisheye image or the second fisheye image;
      modify a projected overlapping image region to visualize the identified moving object on the virtual bowl-shaped projection surface,
      wherein the projected overlapping image region is projected on the virtual bowl-shaped projection surface and corresponds with the overlapping region of the first and second scenes,
      wherein to modify the projected overlapping image region comprises to blend the projected overlapping image region to generate a blended overlapping image region.

2. The computing device of claim 1, wherein to modify the projected overlapping image region comprises to:
   determine a contour of the identified moving object on the selected fisheye image; and
   visualize the identified moving object's contour in the blended overlapping image region.

3. The computing device of claim 2, wherein to visualize the identified moving object's contour comprises to project the identified moving object's contour from the selected fisheye image to the blended overlapping image region of the virtual bowl-shaped projection surface.

4. The computing device of claim 2, wherein to visualize the identified moving object's contour comprises to:
   identify an image region of the selected fisheye image within the identified moving object's contour; and project the identified image region to the blended overlapping image region of the virtual bowl-shaped projection surface to overlay the identified image region on the blended overlapping image region.

5. The computing device of claim 2, wherein the blended overlapping image region of the virtual bowl-shaped projection surface is transparent.

6. The computing device of claim 1, wherein to modify the projected overlapping image region comprises to:
determine a junction between the first and second fisheye images within the overlapping region of the first and second fisheye images based on a location of the identified moving object relative to the first and second fisheye cameras, wherein the junction is a border within the overlapping image region at which to combine the first and second fisheye images;
modify the first and second fisheye images within the overlapping region based on the determined junction;
combine the modified first and second fisheye images at the determined junction; and
project the combined first and second fisheye images to the virtual bowl-shaped projection surface.

7. The computing device of claim 6, wherein to determine the junction between the first and second fisheye images comprises to:
determine a corresponding viewing threshold of each of the first and second fisheye cameras;
select the fisheye image from which to project the identified moving object to the virtual bowl-shaped projection surface based on the identified moving object's relative location and the viewing threshold, wherein the fisheye image is selected from one of the first fisheye image or the second fisheye image; and
determine a corresponding region of each of the first and second fisheye images to project to the virtual bowl-shaped projection surface based on the identified moving object's relative location and the viewing threshold.

8. The computing device of claim 7, wherein the corresponding viewing threshold indicates a maximum and minimum viewing angle that each of the corresponding first and second fisheye cameras is able to capture.

9. The computing device of claim 1, further comprising an overlap determination module to determine an overlapping image region of the first and second fisheye images corresponding with the overlapping image region based on a geometry of a camera system including the first and second fisheye cameras.

10. The computing device of claim 1, further comprising:
a bowl generation module to generate a bowl-shaped image based on the projection of the modified projected overlapping image region to the virtual bowl-shaped projection surface; and
a display module to display the generated bowl-shaped image on a display of the computing device.

11. The computing device of claim 1, wherein the computing device is embodied as an in-vehicle computing system.

12. One or more non-transitory machine-readable storage media comprising a plurality of instructions stored thereon that, in response to execution by a computing device, cause the computing device to:
receive (i) a first fisheye image generated by a first fisheye camera and capturing a first scene and (ii) a second fisheye image generated by a second fisheye camera and capturing a second scene overlapping with the first scene at an overlapping region;
identify a moving object in the overlapping region;
select a fisheye image from which to project the identified moving object to a virtual bowl-shaped projection surface, wherein the fisheye image is selected from one of the first fisheye image or the second fisheye image; and
modify a projected overlapping image region to visualize the identified moving object on the virtual bowl-shaped projection surface,
wherein the projected overlapping image region is projected on the virtual bowl-shaped projection surface and corresponds with the overlapping region captured in the first and second fisheye images,
wherein to modify the projected overlapping image region comprises to blend the projected overlapping image region to generate a blended overlapping image region.

13. The one or more non-transitory machine-readable storage media of claim 12, wherein to modify the projected overlapping image region comprises to:
determine a contour of the identified moving object on the selected fisheye image; and
visualize the identified moving object's contour in the blended overlapping image region.

14. The one or more non-transitory machine-readable storage media of claim 13, wherein to visualize the identified moving object's contour comprises to project the identified moving object's contour from the selected fisheye image to the blended overlapping image region of the virtual bowl-shaped projection surface.

15. The one or more non-transitory machine-readable storage media of claim 13, wherein to visualize the identified moving object's contour comprises to:
identify an image region of the selected fisheye image within the identified moving object's contour; and
project the identified image region to the blended overlapping image region of the virtual bowl-shaped projection surface to overlay the identified image region on the blended overlapping image region.

16. The one or more non-transitory machine-readable storage media of claim 12, wherein to modify the projected overlapping image region comprises to:
determine a junction between the first and second fisheye images within the overlapping region of the first and second fisheye images based on a location of the identified moving object relative to the first and second fisheye cameras, wherein the junction is a border within the overlapping image region at which to combine the first and second fisheye images;
modify the first and second fisheye images within the overlapping region based on the determined junction;
combine the modified first and second fisheye images at the determined junction; and
project the combined first and second fisheye images to the virtual bowl-shaped projection surface.

17. The one or more non-transitory machine-readable storage media of claim 16, wherein to determine the junction between the first and second fisheye images comprises to:
determine a corresponding viewing threshold of each of the first and second fisheye cameras;
select the fisheye image from which to project the identified moving object to the virtual bowl-shaped projection surface based on the identified moving object's relative location and the viewing threshold, wherein the fisheye image is selected from one of the first fisheye image or the second fisheye image; and
determine a corresponding region of each of the first and second fisheye images to project to the virtual bowl-shaped projection surface based on the identified moving object's relative location and the viewing threshold.

18. The one or more non-transitory machine-readable storage media of claim 17, wherein the corresponding viewing threshold indicates a maximum and minimum viewing angle that each of the corresponding first and second fisheye cameras is able to capture.

19. The one or more non-transitory machine-readable storage media of claim 12, wherein the plurality of instructions further cause the computing device to determine an overlapping image region of the first and second fisheye images corresponding with the overlapping image region based on a geometry of a camera system including the first and second fisheye cameras.

20. The one or more non-transitory machine-readable storage media of claim 12, wherein the plurality of instructions further cause the computing device to:
generate a bowl-shaped image based on the projection of the modified projected overlapping image region to the virtual bowl-shaped projection surface; and
display the generated bowl-shaped image on a display of the computing device.

21. A method for visualizing moving objects on a bowl-shaped image generated by a computing device, the method comprising:
receiving, by the computing device, (i) a first fisheye image generated by a first fisheye camera and capturing a first scene and (ii) a second fisheye image generated by a second fisheye camera and capturing a second scene overlapping with the first scene at an overlapping region;
identifying, by the computing device, a moving object in the overlapping region;
selecting a fisheye image from which to project the identified moving object to a virtual bowl-shaped projection surface, wherein the fisheye image is selected from one of the first fisheye image or the second fisheye image; and
modifying, by the computing device, a projected overlapping image region to visualize the identified moving object on the virtual bowl-shaped projection surface,
wherein the projected overlapping image region is projected on the virtual bowl-shaped projection surface and corresponds with the overlapping region captured in the first and second fisheye images,
wherein modifying the projected overlapping image region comprises to blend the projected overlapping image region to generate a blended overlapping image region.

22. The method of claim 21, wherein modifying the projected overlapping image region comprises:
determining a contour of the identified moving object on the selected fisheye image; and
visualizing the identified moving object's contour in the blended overlapping image region.

23. The method of claim 22, wherein visualizing the identified moving object's contour comprises:
identifying an image region of the selected fisheye image within the identified moving object's contour; and
projecting the identified image region to the blended overlapping image region of the virtual bowl-shaped projection surface to overlay the identified image region on the blended overlapping image region.

24. The method of claim 21, wherein modifying the projected overlapping image region comprises:
determining a junction between the first and second fisheye images within the overlapping region of the first and second fisheye images based on a location of the identified moving object relative to the first and second fisheye cameras, wherein the junction is a border within the overlapping image region at which to combine the first and second fisheye images;
modifying the first and second fisheye images within the overlapping region based on the determined junction;
combining the modified first and second fisheye images at the determined junction; and
projecting the combined first and second fisheye images to the virtual bowl-shaped projection surface.

25. The method of claim 24, wherein determining the junction between the first and second fisheye images comprises:
determining a corresponding viewing threshold of each of the first and second fisheye cameras;
selecting the fisheye image from which to project the identified moving object to the virtual bowl-shaped projection surface based on the identified moving object's relative location and the viewing threshold, wherein the fisheye image is selected from one of the first fisheye image or the second fisheye image; and
determining a corresponding region of each of the first and second fisheye images to project to the virtual bowl-shaped projection surface based on the identified moving object's relative location and the viewing threshold.

* * * * *